(12) United States Patent
Ludwig

(10) Patent No.: US 8,935,847 B2
(45) Date of Patent: Jan. 20, 2015

(54) MODULAR REACTIVE DISTILLATION EMULATION ELEMENTS INTEGRATED WITH INSTRUMENTATION, CONTROL, AND SIMULATION ALGORITHMS

(75) Inventor: Lester F. Ludwig, Belmont, CA (US)

(73) Assignee: Lester F. Ludwig, San Antonio, TX (US)

( * ) Notice: Subject to any disclaimer, the term of this patent is extended or adjusted under 35 U.S.C. 154(b) by 569 days.

(21) Appl. No.: 12/882,918

(22) Filed: Sep. 15, 2010

(65) Prior Publication Data

US 2011/0061224 A1    Mar. 17, 2011

Related U.S. Application Data

(60) Provisional application No. 61/243,528, filed on Sep. 17, 2009.

(51) Int. Cl.
| | | |
|---|---|---|
| H05K 3/30 | (2006.01) | |
| B01D 3/00 | (2006.01) | |
| B01D 3/02 | (2006.01) | |
| B01D 3/20 | (2006.01) | |
| B01D 3/32 | (2006.01) | |

(52) U.S. Cl.
CPC ..... *B01D 3/009* (2013.01); *B01D 3/02* (2013.01); *B01D 3/205* (2013.01); *B01D 3/32* (2013.01)
USPC ............ 29/836; 29/832; 29/897.3; 29/592.1; 361/600; 361/679.01; 361/728; 174/520; 174/561; 439/214; 439/215; 202/266

(58) Field of Classification Search
USPC ............ 29/832, 836, 897.3, 592.1, 593, 854, 29/897, 428, 739, 744; 361/600, 679.01, 361/728–733, 143, 174; 174/520, 561; 439/214, 215; 202/266
See application file for complete search history.

(56) References Cited

U.S. PATENT DOCUMENTS

| | | | |
|---|---|---|---|
| 2,715,607 A * | 8/1955 | Lee ............................... | 202/153 |
| 4,548,584 A * | 10/1985 | Townsend ..................... | 434/118 |
| 5,139,044 A * | 8/1992 | Otten et al. .................... | 137/80 |
| 5,196,093 A * | 3/1993 | Weber et al. ................... | 202/83 |
| 7,199,068 B2 * | 4/2007 | Winder et al. ................. | 502/31 |
| 7,239,521 B2 * | 7/2007 | Quero et al. .................. | 361/725 |
| 7,329,389 B2 * | 2/2008 | Horovitz et al. ............... | 422/83 |
| 7,489,835 B1 * | 2/2009 | Xia et al. ....................... | 385/12 |
| 2008/0093131 A1 * | 4/2008 | Couture et al. ................ | 180/9.1 |
| 2008/0223630 A1 * | 9/2008 | Couture et al. ............... | 180/9.32 |

* cited by examiner

*Primary Examiner* — Peter DungBa Vo
*Assistant Examiner* — Jeffrey T Carley
(74) *Attorney, Agent, or Firm* — Procopio, Cory, Hargreaves & Savitch LLP

(57) ABSTRACT

A method for creating laboratory-scale reactive distillation apparatus from provided modular components is described. At least two types of modular distillation column stages are provided. A first type of modular stage comprises two physical interfaces for connection with a respective physical interface of another modular stage. A second type modular stage comprises one such physical interface. At least one type of tray is provided for insertion into the first type of modular stage. A clamping arrangement is provided for joining together two modular stages at their respective physical interfaces for connection to form a joint. The invention provides for at least three modular stages can be joined. At least one sensor or sensor array can be inserted into each modular stage. At least one controllable element can be inserted into each modular stage. The invention provides for study of traditional, advanced, and photochemical types of reactive distillation.

20 Claims, 32 Drawing Sheets

Control structure of reactive distillation with variable feed locations

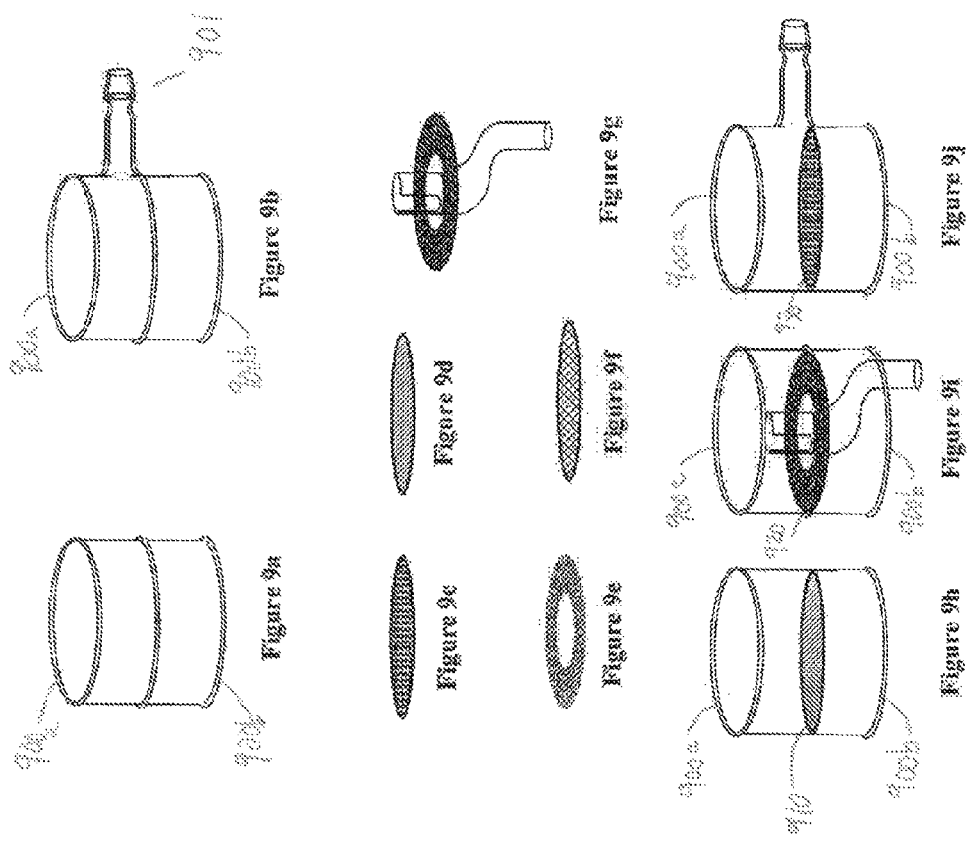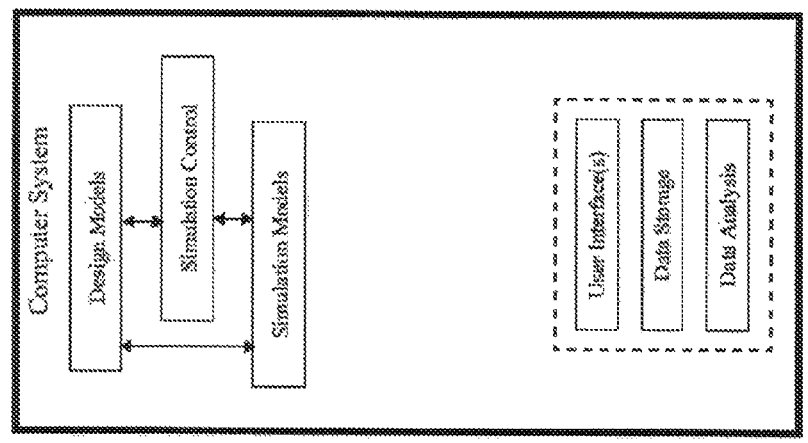

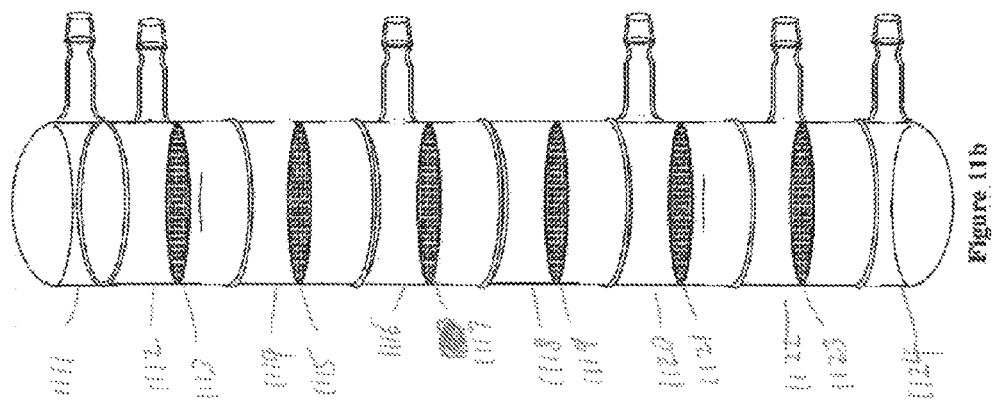
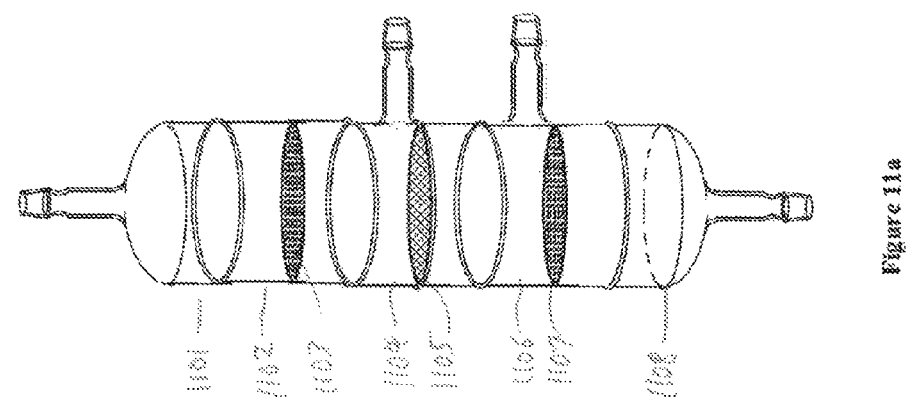
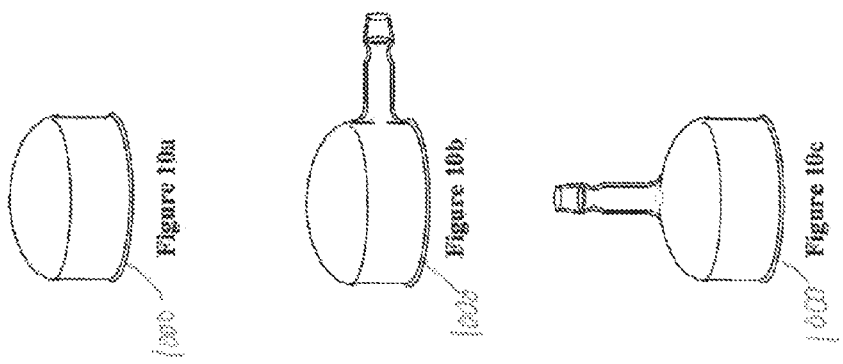

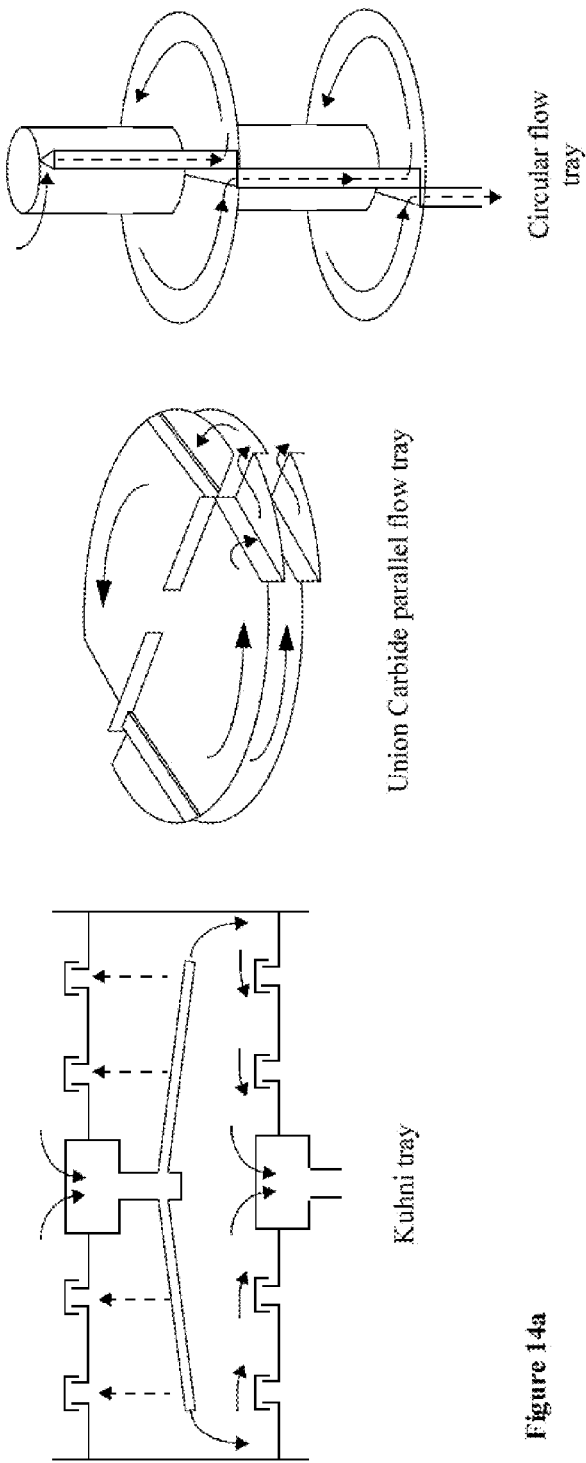
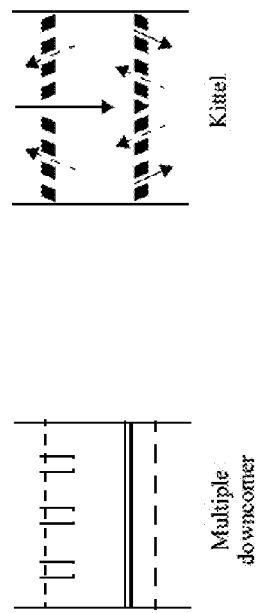
Figure 14a
Figure 14b

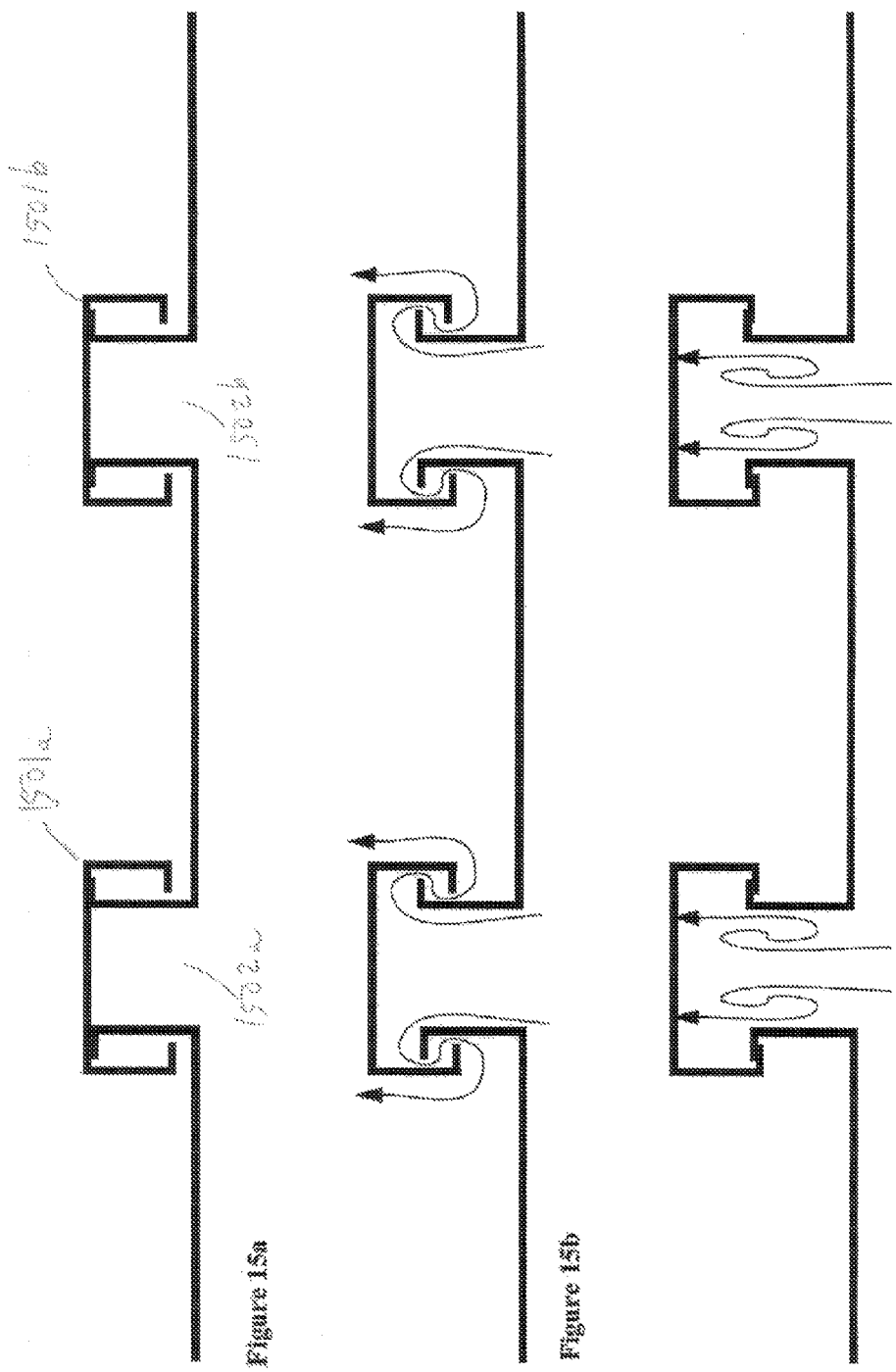

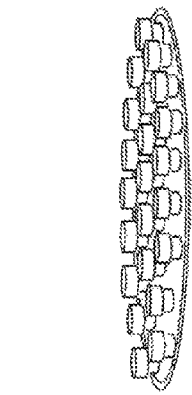
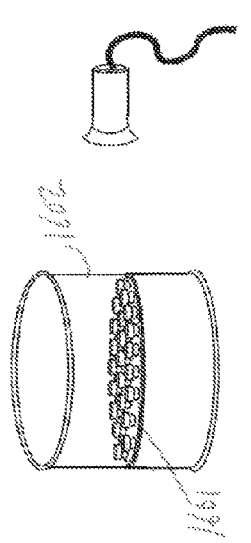
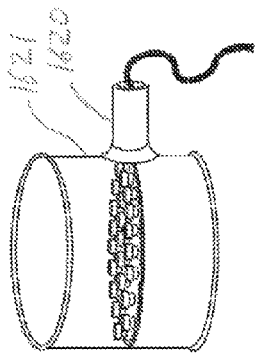
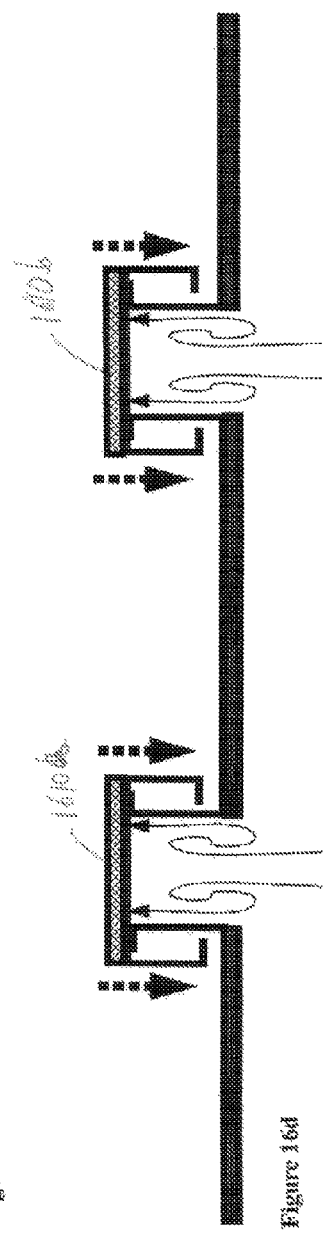

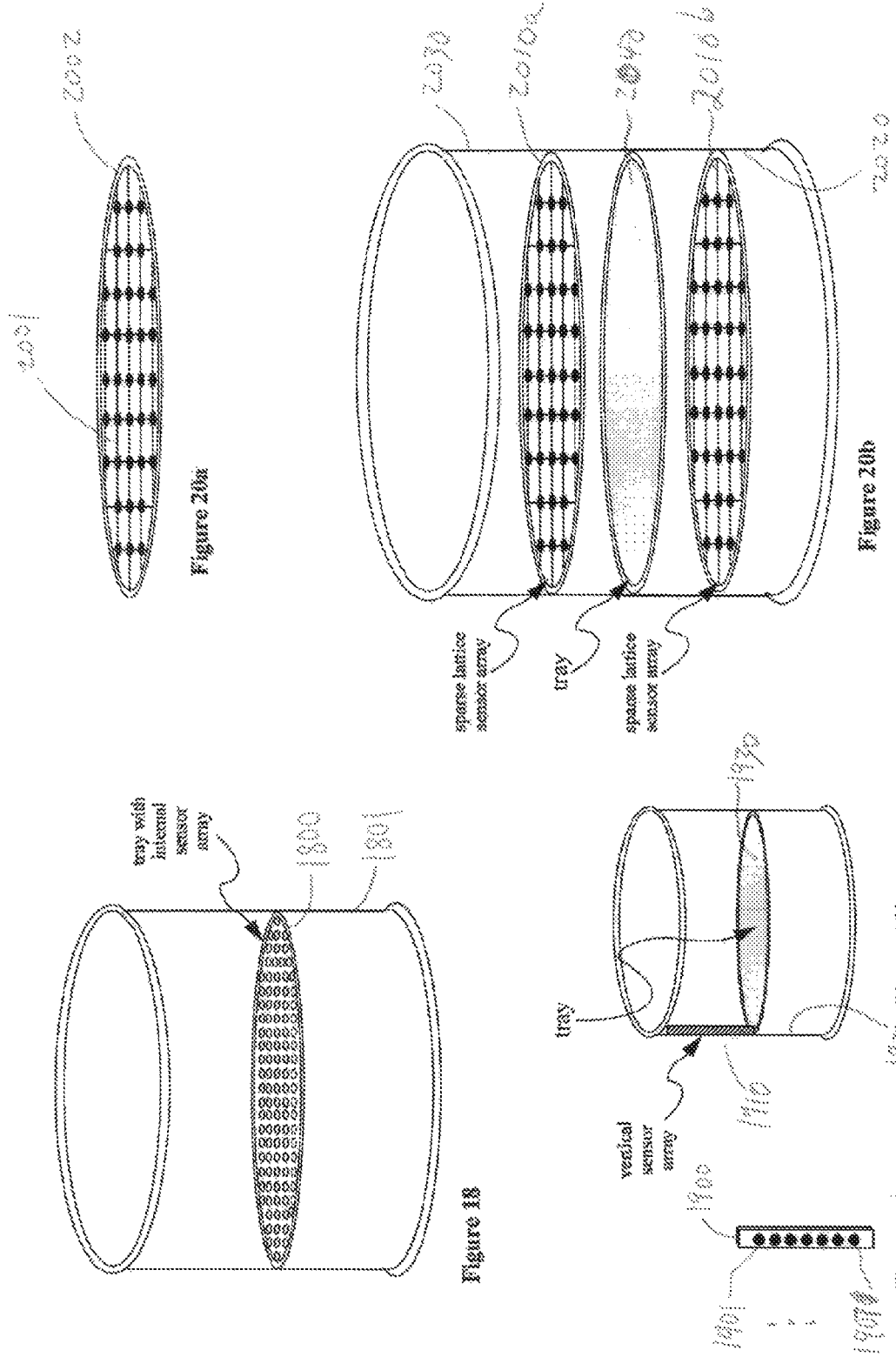

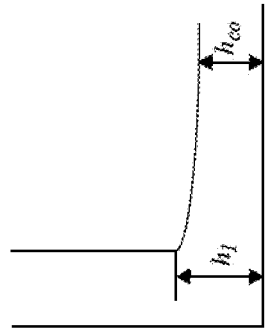
Figure 26a
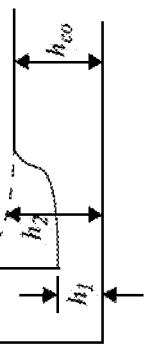
Figure 26b
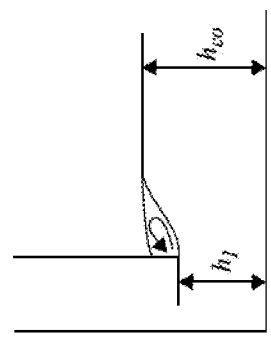
Figure 26c
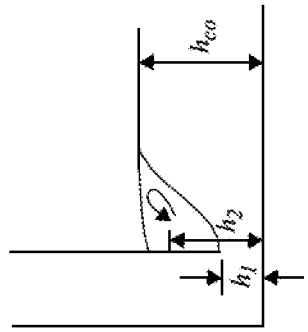
Figure 26d
Alternative liquid entry conditions. (a) Subcritical drowned entry: $Fr_1>1$, $h_{co}>h_1$ (b) Subcritical non-drowned entry: $Fr_1<1$, $h_1>h_{co}$ (c) Supercritical drowned entry: $Fr_1>1$, $h_{co}>h_2$ (d) Supercritical hydraulic jump entry: $Fr_1>1$, $h_2>h_{co}$
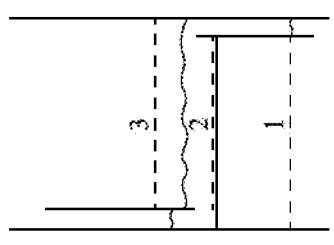
Figure 24 Control surfaces for pressure drop with liquid
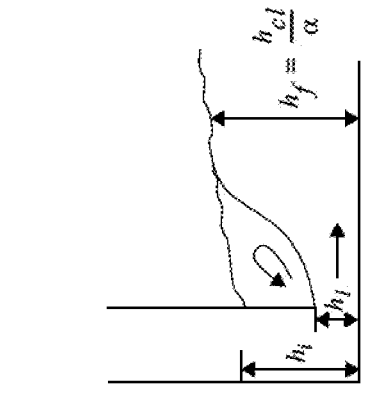
Figure 25 Drowned liquid entry Sequence of steps for theoretical prediction of tray efficiency Full-wave oscillation Half-wave oscillation

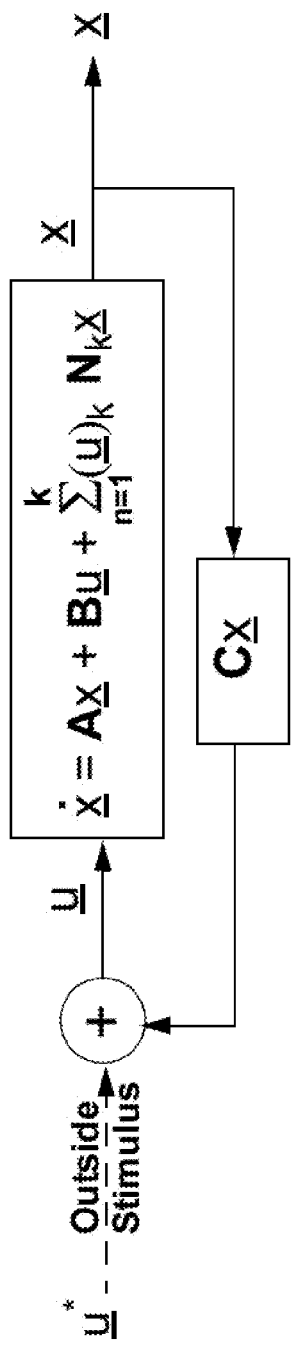
Figure 34
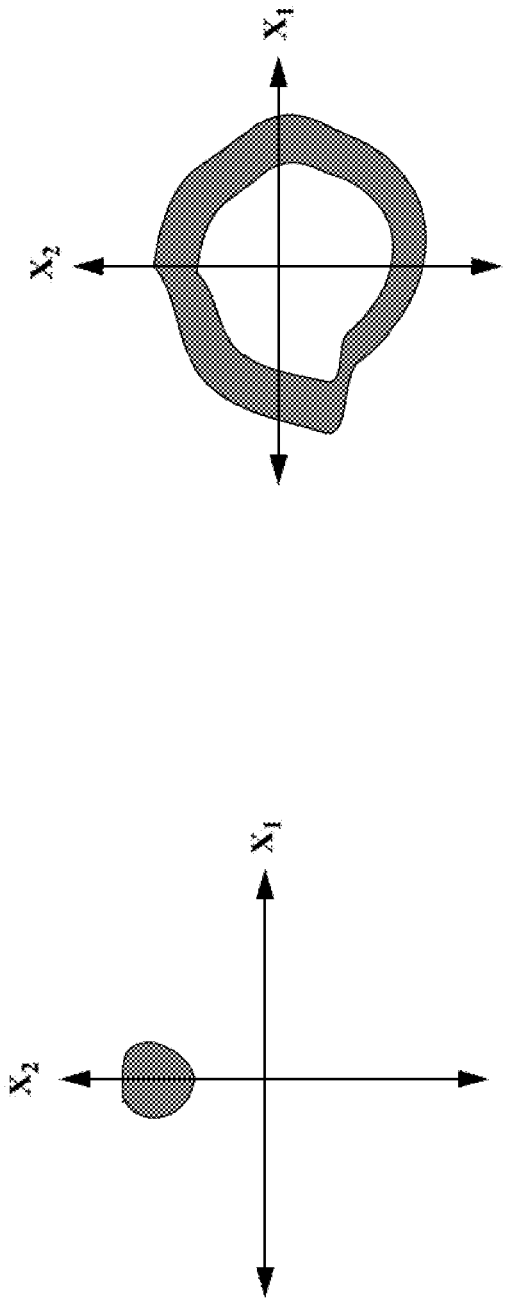
Figure 35b
Figure 35a

MODULAR REACTIVE DISTILLATION EMULATION ELEMENTS INTEGRATED WITH INSTRUMENTATION, CONTROL, AND SIMULATION ALGORITHMS

CROSS-REFERENCE TO RELATED APPLICATIONS

This application claims benefit of priority of U.S. provisional application Ser. No. 61/243,528 filed on Sep. 17, 2009, incorporated herein by reference.

BACKGROUND OF THE INVENTION

1. Field of the Invention

The invention pertains to chemical processing, chemical process design, chemical process modeling, and laboratory apparatus, and in more detail to modular laboratory apparatus and associated components and associated computer systems and numerical models used in the study and design of reactive separation systems, and in particular as applied to reactive distillation.

2. Background of the Invention

Reactive Distillation (RD) integrates reaction and distillation processes and RD has demonstrated itself to be a profound development in the technology of industrial chemical production, particularly when distillation separation is involved. By integrating reaction and distillation processes, RD saves equipment, material, and energy costs. In typical application, RD is applied to reversible liquid phase reactions and at once significantly consolidates apparatus, reduces investment and energy costs, improves production times, provides improved purity, reuses heat of reaction, eliminates needs for some solvents and associated solvent recovery, and facilitates recovery of valuable materials from waste streams [1,2]. Further, RD can be additionally attractive due to valuable synergies. Examples of such synergies include shifts in chemical equilibrium conditions (for example as a result as the removal of products) and surpassing of usual distillation limits and reuse of exothermic heat generation as a benefit to the integrated reactions.

Notable History of Reactive Distillation

The earliest examples of processes in which RD was utilized did not attract attention as a notably different class of operation. The 1860's commercial Solvay ammonia recovery process is typically attributed as the first identified use of RD. This at least implicit use of RD was later followed by what amounts to RD production of propylene oxide, ethylene dichloride, sodium methoxide, and various esters of carboxylic acids [1].

It was for MTBE (methyl tertiary-butyl ether) that the RD process gained separate noteworthy status as utilizing a multifunctional element or step involving both a reactor and separator. This was dramatically followed by the now famous Eastman Kodak methyl acetate process that condensed an entire medium-scale methyl acetate chemical plant (comprising a reactor, nine columns, and extensive associated equipment and conduits) in a single Reactive Distillation multifunctional unit that directly accepted reactants and directly delivered pure products [1,2]. FIG. 1 depicts a representation of the Eastman Chemical methyl acetate RD apparatus.

In MTBE, ETBE (ethyl tertiary-butyl ether), and TAME (tertiary amyl methyl ether) etherification, RD can transcend equilibrium limitations and provide greater than 99% conversion [1]. A two-stage RD process providing simultaneous hydration and etherification can be used to produce di-isopropyl ether (DIPE) from propylene and water. Further, MTBE synthesis can be integrated with MTBE decomposition in a closed system [1] to provide pure isobutene where conventional distillation fails from too-closely clustered C4 boiling points. FIG. 2 (adapted from [5]) depicts a representation of the Hickey and Adams TAME RD apparatus.

In the Eastman Kodak high and ultra-high purity RD processes, an otherwise unworkable equilibrium limitation is traversed with no excess feedstock and is combined with sufficiently high reflux. The Eastman Kodak RD system proved to require only 20% of the capital investment and 20% of the former operating energy [2].

RD has been successfully applied on a commercial scale to etherification, esterification, selective hydrogenation, hydrodesulfurization, isomerization, and oligomerization, while hydrolysis, alkylation, acetalization, hydration, and transesterification have been identified as RD candidates [1,2]. Also cited as applications for reactive distillation are aldol condensation, amination, dehydration, and hydrolysis, among others.

More broadly, RD is one member of a larger evolving family of reactive separation processes that integration reactions and separations into a unified operation delivering various advantages. Other types of reactive separation processes include reactive chromatography, reactive membrane separation, reactive crystallization, reactive absorption, reactive adsorption, reactive extraction, and reactive stripping.

FIG. 3 shows a somewhat expanded view adapted from Aida & Silverston [6] depicting a few types of separating reactor systems differentiated according to phases of reactants, catalysts, etc. In Aida & Silverston RD is treated as lying at the intersection of gas, solid, and liquid phase considerations due to assumed role of solid catalysis, but more broadly need not be confined in this way.

Typical Situations Applicable to Reactive Distillation

RD is a natural candidate for consideration where shared temperature and pressure conditions facilitate both reversible chemical reactions and distillation-oriented phase equilibrium. RD performs some transcendent abilities (for example, overcoming chemical equilibrium product concentration limitations) through the use of distillation for removal of products from reacting feedstocks. To best accomplish this, reaction products should be at the density extremes (lighter and/or heavier) with the reactants having densities away from the extremes. In an ideal two-product case, one product is the heaviest among the products and reactants while the other product is the lightest, and the product boiling points should be at diametric extremes [2].

RD as defined thus far is applicable to limited situations where both chemistry and vapor-liquid (phase) equilibrium are sufficiently compatible. There are many types of RD arrangements and success stories within this range of situation. Some representative detailed documented examples include those classified in the following groups:

2 reactants, 2 products;
1 reactant, 2 products;
2 reactants, 1 product;
1 reactant, 1 product.

(It should be noted that some systems, particularly those involving two-stage or multi-stage RD, have intermediaries that could be viewed as additional products, i.e., more than the 1 or 2 cited in the above list). In these examples, a variety of distillation column structures have been utilized according to the types of reactions and distillation arrangements involved [2].

There are more specific and yet other typical requirements for "traditional" RD [2]:

- On each tray, reactions and vapor-liquid (phase) equilibrium share the same temperature. Temperatures and pressures in the column affect both phase equilibrium and chemical reaction kinetics (It is noted, however, that mismatches between chemical reaction temperature ranges and vapor-liquid equilibrium temperature ranges can be handled by side reactors);
- Individual and relative volatilities of components must permit reactants to be confined within the column and products readily removed and refluxed at the top and bottom of the column;
- Reactions must be liquid phase as there is little hold-up (and hence little opportunity) for vapor phase reactions;
- Heats of reaction (or their dispersion) must not invoke excessive changes in vapor and liquid transport rates through the reaction zone.

Traditional Monitoring and Control Techniques for Reactive Distillation

Traditional RD systems as established employ the following types of process controls [2]:
- Control of incoming flow rates of limiting reactant feeds;
- Control of outgoing flow rate of bottom products;
- Control of outgoing flow rate of distillate products;
- Control of reflux ratios;
- Control of pressure (controlled by condenser duty);

RD systems as established employ the following types of process measurements [2]:
- Temperature(s) at or between carefully chosen "control trays;"
- Column pressure;
- Column fluid base level.

The universal types of RD control systems are those utilizing temperature measurements made on carefully chosen "control trays" to control incoming reactant feed rates [2].

Design Considerations for Reactive Distillation Systems and Processes

In the design of RD systems, the typical types of structural design parameters are [2]:
- Column pressure (which influences RD far more significantly than conventional distillation and is one of the most fundamental design parameters);
- Number of reactive trays;
- Number of fractionating (rectifying and stripping) separation trays;
- Reactant feed locations (unless near border of reaction zone, the location of light feed is far more significant than location of heavy feed);
- Tray holdup;
- Catalyst choice;
- Packing materials, arrangements, and structures.

Mathematical and Computer Models for Reactive Distillation

Design methods for RD systems are evolving, particularly through the use of commercial software tools and incorporate increasingly sophisticated mathematical tools (for example, homotopy methods). Popular design methods done in isolation or employing commercial design software include:
- Equilibrium conditions for both reactions and inter-phase phenomena [1].
- Transformational methods [1].
- RD line diagrams (noting that these typically require careful treatment to ensure thermodynamic consistency [1]).

These and other design methods rely on underlying models. There are typically two types of models in common use, although each can be considerably embellished:

- Stage (aka "Equilibrium") models:
    - Vapor-liquid phase equilibrium within each theoretical stage,
    - Mass balance for each theoretical stage,
    - Can include tray efficiency models—for example:
        - overall (Fenske) efficiency (calculated across entire column),
        - average tray (Murphree) efficiency (calculated across entire tray),
        - point efficiency (calculated at some specified point),
        - packing tray efficiency metrics such as HETP (Height Equivalent per Theoretical Plate) and NTSM (Number of Theoretical Stages per Meter).
- Rate-based models:
    - Mass transfer handled by equations,
    - Heat transfer can be included,
    - Vapor-liquid phase equilibrium at interfaces only.

In general these models and other design methods must employ a firm understanding of properties of the reacting fluids, pressure/temperature phase equilibriums, azeotropic properties, and at times very specialized details peculiar to a specific problem. Regarding this and model embellishments, it is noted that model complexity increases significantly if mass transfer and/or reaction rates are included [1].

RD design inherits a number of finer-scale issues, design processes, and models from conventional distillation[3-5,8,9,10]:
- Pressure variation static and dynamic) among trays (due to fluid blockage of vapor paths, etc.);
- Fluid oscillation (sloshing) on trays (full-wave, half-wave, etc.);
- Weeping;
- Flooding;
- Varying and mixed flow regimes (between weeping and flooding) [3,4] such as spray, froth. emulsion, bubble, and foam:
- Liquid viscosity;
- Stagnant regions at tray edges;
- Packing (minimize pressure drop with increasing residency time);
- Catalysis surface chemistry and processes (ion-exchange resins, metals, etc.).

Use of Heuristics in Design of RD Systems and their Control

RD work to date has led to a number of design heuristics. A few example design heuristics for the quaternary A+B=C+D system include (adapted from [2] pp. 529-534):
- The feed of lightest reactant should be positioned higher on column than the feed for heaviest reactant;
- If the relative volatility between reactants is small, position reactant feeds close together;
- The reactant feeds are best separated further as relative volatility between reactants increases;
- If relative volatility between lightest reactant and lightest product is large, the feed locations are best positioned upwards into the upper reactive zone;
- If relative volatility between heaviest reactant and heaviest product is large, the feed locations are best positioned downwards into the lower reactive zone;
- If rate constants are small, feed trays are best positioned with greater separation in the column; conversely if rate constants are large, feed trays are best positioned with lesser separation in the column.

Additionally, various control heuristics are being established in industry, for example the choice of which trays are employed for temperature monitoring used to control incoming reactant flow rates (so that, for example, increasing temperature produces increasing flow rates [2]).

Incorporation of Additional Processing Structures into Reactive Distillation

In addition to the traditional RD configurations depicted in FIG. 1 and FIG. 2, workers in the field have incorporated additional functional elements to attempts to overcome shortcomings in traditional RD configurations for certain processes and to expand the types of chemical production to which RD can be productively applied. Some of these architectural and process variations include:

- Side reactors (with and without heating) can be used to address mismatches between chemical reaction temperature ranges and vapor-liquid equilibrium temperature ranges [2]. Such arrangements permit the column to be operated at temperatures and (lower) pressures suitable for distillation while some chemical reactions are permitted to occur outside the column at temperatures and (higher) pressures suitable for reactions. Although separate reactors are employed, the resulting arrangement can still be considered RD because (i) reactive operations occur simultaneously with the distillation rather than sequentially with it, and/or (ii) reactions occur in the column. FIG. 4a depicts an RD column with a plurality of side reactors without the feed effluent heat exchanger (FEHE) elements. The lack of FEHE elements requires larger sizes of side reactor vessels. FIG. 4b depicts an RD column with a plurality of exemplary side reactors further supported by heat-exchange FEHE elements so as to reduce the size of side reactor vessels.
- Control though use of "variable feed locations" (aka "feed tray manipulation" and "coordinated control"). FIG. 5 depicts an RD column with variable feed positions that can be controlled by valves;
- Addition of Mass Separation Agents (MSA), also referred to as "entrainers," to modify the relative volatilities of the components of an azeotrope it is able to interact with.

Design, Prototyping, and Scale-Up

A major challenge in the design of any distillation system is that of scale-up to a production facility based on a sequence of designs, models, laboratory prototypes, and pilot plants. Although the issues are well-known to one skilled in the art, a quick review of considerations, implementation heuristics, concerns, etc. for distillation system scale-up can be found in [11]. As challenging as scale-up is for conventional distillation systems, scale-up of laboratory-scale RD designs to commercial scale remains essentially impractical. A number of suspected issues are described in the Research Efforts section following below.

Although other approaches are possible, FIG. 6 depicts a representation of an example RD design process as relevant to the invention. Starting from conception, a high-level design may be used to create a detailed design. The high-level design and detailed design can be further refined using computer modeling. Computer models and detailed design can be employed at each of the steps of evolution from laboratory prototype to pilot plant to industrial plant capable of commercial operation.

Although RD has a well-appreciated pay-off for medium-scale to large-scale industrial plants when successfully implemented, it is also possible for RD to be attractive to small-scale production, for example in the small-scale production of limited-demand specialty and fine chemicals. Among the reasons for this are the abilities of RD to achieve high-levels of purity and for making certain types of reactions obtainable. In other cases, the equipment, materials, and energy savings provided by successful RD processes can also serve as an attractive factor in the small-scale production of limited-demand chemical products. Accordingly, FIG. 6 also shows in dashed lines an alternative evolution path for development of small-scale production and commercialization.

Research Efforts in Reactive Distillation

The synergies that provide RD so many potential advantages also make more general RD design, operation, understanding, and applicability very complicated [1]. First there are the inherent fundamentals of RD requiring situations where both chemistry and vapor-liquid (phase) equilibrium are sufficiently compatible. These must be merged with traditional reactor design, catalysis design, column design, tray design, and other related design issues for basic hardware and operation. Closed-loop control of the many controllable elements, and opportunities for further degrees of closed-loop control through the introduction of additional controllable elements and measurements, further expand the possibilities and complexity. Additional augmenting structures, such as those of FIGS. 4a, 4b, and 5 described in the previous section expand the possibilities and complexity yet further. Meanwhile, better mathematical and computer-based modeling and in the incorporation of applicable advanced mathematics each dramatically open the field to further advancement.

All of the aspects cited above stem from corporate and academic research efforts over the years. In some cases, the promise of RD has led to the creation of multi-institution programs involving both academia and industry. Two prominent pan-European programs 1996-1999 Brite-Euram (participants BASF, BP, Hoechst, Neste Oy, Snamprogetti together with Aston, Bath, Clausthal, Dortnund, Helsinki, and Moscow Universities) and the 2000-2003 Intelligent Column Intervals for Reactive Distillation ("INTINT") project (AEA, BASF, DSM, Montz, Sulzer, together with Delft, Lappeenrannan, Manchester, Stuttgart, and Politehnica Universities and consortia/organizations PETROM, RDCRI, PAC-ICE, ICSO) were undertaken, each with a collective budget of ~$4 million USD.

These programs were well-organized with useful and interesting deliverables. However, the inherently complex and readily evolvable field of RD is still far from comprehensive understanding. Additionally, important if not essential issues such as multiple steady-states, scale-up, spatiotemporal behavior, and others remain barely understood, and the many known, proposed, and inherently likely new architectural variations and control system innovations provide vast potentials that remain largely unexplored.

Almost all of the aspects listed above remain in active research with many problems and areas of poor understanding persisting.

Another important research area is that of RD system scale-up from laboratory prototypes. The ultimate goal is to skip costly and expensive pilot plants, but such scale-up of RD designs from lab to commercial scale is still essentially impractical due to reasons thought to potentially include [1]:

- Interactions among mass-transfer processes and reaction processes can be more pronounced at larger scales;
- Lab-scale packing can differ significantly from plant-scale packing (for example differing by a factor of 2 in the number of theoretical stages;
- Incomplete catalyst wetting;
- Temperature gradients in reactive packing;
- Distribution irregularities of reactants;
- Lab-scale separation efficiencies can differ significantly from those at plant-scale;
- Lab-scale (~50 mm dia.) column closely described by equilibrium-stage models, not true for plant-scale columns of only six-times larger diameter (~315 mm dia.).

Another area where many problems and areas of poor understanding persist is in complex mixture structures. For example:

Relative volatilities can be temperature dependent. This can create situations where a particular RD system design cannot operate because the role and ordering of at least one product volatility is exchanged with that of at least one reactant volatility (i.e., one or more reactants would tend to leave the top or bottom of the column while one or more products would tend to be retained in the reactive zone;

Vapor-liquid equilibrium model of quaternary mixture usually characterized by binary system information only. As a representative example of concern, there are 6 binary mixtures in the quaternary-mixture of 1-hexol+ acetic acid+hexyl acetate+water, two of which are reactive. Sensitivity analysis can be used to demonstrate various issues that standard methods (for example group contribution methods for interpolation of mixture data) cannot account for;

Formaldehyde (a key C1 process compound) is usual manifest as an aqueous solution also including methanol, a system that turns out to be far more complex than a ternary mixture (in fact comprising more than 20 compounds in notable concentrations).

There are many other examples, typically involving complex chemical reactions and likely requiring some method other than titrations (for example spectroscopy has been suggested [1]) in order to determine actual concentrations.

An additional area where many problems and areas of poor understanding persist is in a collection of unexpected emergent RD issues and phenomena including [1]:

Multiple steady states;
Reaction/distillation oscillatory behavior;
Spatiotemporal phenomena;
Reacting azeotropes;
Startup processes, dynamics and stabilization.

Further, ongoing R&D in RD has also led to a number of architectural and process variations:

Multi-stage RD systems, which although not uncommon are not fully understood and are in need of deeper study;
Use of side reactors (as discussed above)
Control though use of "variable feed locations," aka "feed tray manipulation" and "coordinated control," (as discussed above);
Use of Mass Separation Agents (MSA), also referred to as "entrainers" (as discussed above).

Yet further, there may be opportunities wherein RD can be successfully and attractively extended beyond the traditional limited situations where both chemistry and vapor-liquid (phase) equilibrium are sufficiently compatible.

Each of the areas listed above, as well as many others, lie open for extensive future research.

Need and Opportunities for New R&D Tools for Reactive Distillation

Many academic and industrial programs continue to research RD further. However, although there are exceptions, many of these efforts and resultant publications appear to become increasingly formulaic and/or adding value by bringing in known techniques from naturally related areas (such as numerical analysis) and knitting approaches and models together (for example including extensive detailed hydraulics analysis). Such contributions are indeed of critical importance in building the needed foundations and framework of understanding, but are not in themselves vehicles of groundbreaking innovation.

In comparing the evolution of RD with examples in other technology evolution trajectories, it can be recognized that there is an important need for new tools, new means of discovery, and a new sense of adventure in RD research and development. It is to these needs for new RD tools, discovery, and adventure in RD research and development that the present invention is directed.

Overview and Example Benefits of the Present Invention

Overall, the present invention addresses the need for new tools for R&D in Reactive Distillation with the following contributions:

New tools for RD academic research and process development:
  Modular stages (for example, in the form of modular glassware) that can comprise one or more attachable or built-in sensors, controllable actuators, computer interfaces, and adjustable internal structures,
  Packing and catalyst instrumentation,
  New types of numerical tools,
  Combinations of numerical tools and real-time monitored operation:
    To study and model physical phenomena,
    To improve what can be done at lab scale in lieu of creating a pilot plant;
New types of RD measurement structures and measurement elements;
New types of RD control structures and controllable elements;
New types of RD control systems.

A partial overview of the invention includes the following attributes:

Modular stages (for example, in the form of modular glassware) for lab-scale implementations of reactive distillation columns (and associated architectures);
Modular stages (for example, in the form of modular glassware) fitted with special structure control options:
  On/off and/or metered valves (automated or manual);
  Tray parameters (magnetic servo) (to realize variable hold-up, for example),
  Local thermal exchange;
Modular stages (for example, in the form of glassware) fitted with special instrumentation options:
  Temperature sensors in one or more locations (including 1-D & 2D temperature sensor arrays for spatiotemporal studies),
  pH sensors,
  Ion-specific sensors,
  Spectroscopy sensors,
  Fluid level monitoring;
  Imaging sensors:
    Video cameras and associated illumination,
    IR cameras for thermal imaging,
    UV cameras and associated illumination for spectral absorption and emission imaging;
  gas/liquid flow-rate measurements;
Computer interfaces for control and monitoring;
Instrumentation support/analysis software:
  Real-time statistical analysis,
  Real-time image analysis/recognition,
  Calculation of implied variables from measured data;
Control algorithm library;
Integration of real-time simulation w/ real-time monitoring.

FIG. 7 depicts a representation of some of the targeted value of some of the functional aspects of the RD innovations provided by the invention. Pertaining to the areas of conception, high-level design, and detailed design, the invention provides a broad range of new methods, new design options, and new potential applications. Pertaining to the areas of computer models and computer interfacing with laboratory-scale prototypes, the invention provides advanced instrumentation, modular architectures, new types of RD controls, reconfigurability, expanded numerical models, new methods combining modeling, simulation, and emulation. Pertaining to the area of pilot plants and industrial production plants, the invention provides the capabilities of new generations of RD architectures, components, measurements, and control. Pertaining to the area of laboratory-scale prototypes and their scale-up to small-scale production (for example for the commercial production of limited-demand specialty and fine chemicals), the invention provides advanced instrumentation, flexible customization through modular structures, new types of RD controls, reconfigurability, and support for new types of RD architectures via its modular structures.

The invention is expected to result in at least the creation of several new tools for RD research and design. This includes at least modular distillation and RD stage elements and interior components providing embedded instrumentation and associated computer interfaces and user interfaces. Additionally, it is very likely the integrated platform, bringing together a number of unique innovations and so many aspects of RD processes, mathematical modeling, and software systems will result in additional discoveries or new methods of RD, as well as s possible extensions to new types of production not known to have an advantageous RD approach or solution.

The invention provides for exploring scale-up process-divergence emulation via physical lab-scale emulation and/or numerical compensation.

In that RD has demonstrated it can save huge factors in operating energy and capital cost, as well as eliminating the need for so many solvent materials and processes as well as fewer points of failure, the extended new tools and understanding likely from the proposed research is likely to have valuable environmental impacts (energy and toxic pollutants) and cost reductions. In that distillation is among the great environmental offenders in chemical production, the likely innovations and results are an excellent target for investment.

Further, the integrated information system, simulation and lab-scale instrumentation framework provided for by the invention can be used to explore other less popular types of reactive separation [6,7] that in turn can be used in quite different settings, for example in lab-on-a-chip technologies.

Additionally, the instrumentation and numerical mathematical model implementations provided for by the invention can be used to shed new light on spatiotemporal phenomena in RD systems, perhaps finding ways to control and/or exploit it in commercial processes. Such results can also contribute a new chapter to the understanding and commercially exploitive use of self-organizing systems.

SUMMARY OF THE INVENTION

In one aspect of the invention, a range of modular RD column elements and associated high-performance connecting clamp mechanics are provided. These can be combined to create a larger assembly comprised of modular RD column elements. In an embodiment, each modular RD column element has at least one physical interface for connection with the physical interface of another modular RD column element. In an embodiment, pairs of individual modules can be connected together at physical interfaces and held together by clamps. In an embodiment, at least one type of modular RD column element comprises two physical interfaces so as to permit three or more modular RD column elements to be linked to form a tandem lineage of the three or more modular RD column elements.

Another aspect of the invention provides for incorporating various types of sensors and sensor layouts (point, linear array, 2D-array, 3D-array) into modular RD elements. In an embodiment the invention includes at least localized temperature sensors into a modular stage. In an embodiment the invention includes at least localized pressure sensors into a modular stage. In an embodiment the invention includes at least localized ion sensors into a modular stage. In an embodiment the invention includes at least localized pH sensors into a modular stage.

Another aspect of the invention provides for incorporating various types of sensors (point, linear, array) into packing compatible w/ modular RD glassware elements.

Another aspect of the invention provides for integrating at least localized temperature and pressure sensors into the lab-scale packing elements.

Another aspect of the invention provides for integrating at one other type of sensor into the lab-scale packing elements.

Another aspect of the invention provides for incorporating various types of controllable actuators into modular RD glassware elements. In an embodiment, the invention provides for candidate controllable actuators to include inter-tray liquid flow modulation. In an embodiment, the invention provides for candidate controllable actuators to include inter-tray vapor flow modulation. In an embodiment, the invention provides for candidate controllable actuators to include zone temperature modulation. In an embodiment, the invention provides zone temperature modulation via controllable heat exchange. In an embodiment, the invention provides for candidate controllable actuators to include variable holdup modulation. In an embodiment, the invention provides for candidate controllable actuators to include catalysis surface area modulation. In an embodiment, the invention provides for candidate controllable actuators to include inert dilution modulation.

In another aspect of the invention, controllable mechanical actuator elements can be operated by moving components through glass under the influence of externally provided electromagnetic coupling.

In another aspect of the invention, said moving components are encapsulated in glass so as to prevent chemical interactions and attack.

Another aspect of the invention provides for electronics, computer data transfer interfaces, and software drivers for sensors within or associated with modular stages.

Another aspect of the invention provides for an arrangement for gathering real-time sensor data from a plurality of sensors.

Another aspect of the invention provides for an arrangement for activating actuators under real-time software control.

Another aspect of the invention provides for a data signal arrangement for via a simple bus arrangement allowing a large column with a variety of modular elements to be interfaced to a computer with a single small cable.

Another aspect of the invention provides for real-time GUIs and real-time data capture software modules.

Another aspect of the invention provides for a user interface for displaying real-time sensor data from a plurality of sensors.

Another aspect of the invention provides for an arrangement for activating actuators under real-time software control as controlled by the real-time GUI.

Another aspect of the invention provides for integrating real-time GUIs and real-time data capture software modules with simulation software.

Another aspect of the invention comprises a framework for integrating at least a real-time GUI, data capture functions, and simulation functions.

Another aspect of the invention provides an arrangement for exploring and developing new types of RD system architectures.

In an embodiment, the invention comprises a modular element that provides for photochemical reactions in the assembled RD column. In an embodiment, the invention comprises a modular element that provides at least one additional feed into the assembled RD column. In an embodiment, the invention comprises a modular element that provides at least one additional draw from the assembled RD column.

In an embodiment, the invention links to a cyclic separation reactor. [6]. In an embodiment, the cyclic separation reactor implements temperature swing. In an embodiment, the cyclic separation reactor implements pressure swing.

In an embodiment, the invention employs chromatographic separation elements [6,7]. In an embodiment, the invention employs membrane separation elements [6,7].

In an embodiment the invention provides for employing cyclic separation reactor formalisms in its design [6].

Another aspect of the invention provides for new types of control system approaches and prototype their algorithmic implementations.

Another aspect of the invention provides for at least one new control system approach. In an embodiment, the invention employs at least one real-time sensor measurement other than temperature or pressure.

Another aspect of the invention provides for integration of real-time simulation with real-time monitoring.

Another aspect of the invention provides for integrating real-time simulation and monitoring into the same system under the control of a common user interface.

Another aspect of the invention provides for additionally incorporating real-time sensor measurements from a laboratory-scale prototype to an integrated simulation model.

Another aspect of the invention provides for the use of state variable bilinear differential equation models.

In an embodiment, the invention provides for the use of state variable bilinear differential equation models with state variable feedback.

In an embodiment, the invention provides for the incorporation of bilinear differential equation state variable feedback stability models.

In an embodiment, the invention provides for the use of state variable bilinear differential equation models with state-variable feedback to render cross-product terms in a mathematical RD process model.

In an embodiment, the invention provides for the use of state variable bilinear differential equation models to identify a mathematical prediction of a nonlinear instability.

In an embodiment, the invention provides for the use of state variable bilinear differential equation models to be used in conjunction with a lab-scale system demonstrating an instability (for example, minor oscillations in operation).

Another aspect of the invention provides measurement and control system infrastructure for study of spatiotemporal dynamics. In an embodiment, the invention provides for the use of array sensor instrumentation to confirm spatiotemporal dynamics in an RD column.

Another aspect of the invention provides measurement and control system infrastructure for compensating for spatiotemporal dynamics in process control.

Another aspect of the invention provides measurement and control system infrastructure for utilizing spatiotemporal dynamics in process control.

Another aspect of the invention provides for responsively modulating feedstock inflow locations.

Another aspect of the invention provides for responsively modulating controllable tray parameters.

In an embodiment the invention provides for exploring the emulation of scale-up process-divergence. In an embodiment the invention provides for identifying divergences that can be accurately modeled.

In an embodiment the invention provides for devising model compensation where feasible (for example via physical emulation or numerical simulation).

In an embodiment the invention provides for devising measurement compensation where feasible (for example via physical emulation or numerical simulation).

BRIEF DESCRIPTION OF THE DRAWINGS

The above and other aspects, features and advantages of the present invention will become more apparent upon consideration of the following description of preferred embodiments taken in conjunction with the accompanying drawing figures.

FIGS. 8a-8f depict exemplary arrangements that demonstrate some of the functional aspects provided for by the invention.

FIG. 9a shows an exemplary modular stage to which internal elements can be inserted and fitted. FIG. 9b shows an exemplary variation on the modular stage of FIG. 9a providing an example connection point for fluid and/or gas exchanges. FIGS. 9c-9f show exemplary variations of tray elements that can be fitted within the example modular stages such as those of FIGS. 9a and 9b. FIG. 9g shows an example variation of another tray element that can be fitted within the example modular stages of FIGS. 9a and 9b. FIG. 9h shows an exemplary arrangement of a modular stage of FIG. 9a fitted with a tray style represented by FIG 9d. FIG. 9i shows an exemplary arrangement of a modular stage of FIG. 9a fitted with a tray arrangement represented by FIG. 9g. FIG. 9j shows an exemplary arrangement of the modular stages of FIG. 9b fitted with a tray style represented by FIG. 9c.

FIGS. 10a, 10b, and 10c depict exemplary modular stages, each comprise one physical interface for joining with another modular element (in contrast with modular stages of FIGS. 9a, 9b, 9h, 9i, and 9j that comprise two such physical interface for joining with other modular elements).

FIGS. 11a and 11b depict representative stacks of multiple modular elements of various types combined in tandem to form at least portions of (experimental laboratory-scale or small-scale production) distillation columns.

FIGS. 14a-14c depict a few representative inter-tray flow arrangements and associated tray designs employing them.

FIGS. 15a-15c depict general operation and features of a representative bubble-cap tray as used in distillation columns.

FIG. 16a depicts a representative bubble-cap tray element as provided for by the invention.

FIG. 16b shows the bubble-cap tray element of FIG. 16a positioned within a modular stage.

FIG. 16c depicts a case where ferromagnetic material on the surface of a tray is not subjected to a magnetic field and thus asserting no magnetic attractive force on the ferromagnetic material in the bubble-caps.

FIG. 16d a case where ferromagnetic material on the surface of a tray is actively subjected to a magnetic field and thus asserts an attractive magnetic force on the ferromagnetic material in the bubble-caps in opposition to the force asserted by pressure from fluids, vapors, and gasses.

FIG. 16e depicts a representation of an electromagnetic coil that can be used to deliver a controllable magnetic field to the tray (as described above) or other magnetically-operated elements in a modular stage.

FIG. 16f depicts a representation of the electromagnetic coil positioned against or permanently attached to the outside wall of a modular stage.

FIG. 17b depicts a modular stage fitted with the tray element of FIG. 17a.

FIG. 18 depicts an example of a two-dimensional lattice array of sensors built into a tray, the tray itself positioned within a modular stage.

FIG. 19a depicts an example of a 1-dimensional linear array of sensors integrated into a common housing to form a sensor submodule. FIG. 19b depicts an example the sensor submodule of FIG. 19a positioned vertically along the interior wall of a modular stage.

FIG. 20a depicts an example of a sparse two-dimensional lattice array of sensors integrated into a common tray-like housing to form a sensor submodule. FIG. 20b depicts an example of the use of two sensor submodules such as that depicted in FIG. 20a positioned along the interior wall of a modular stage on either side of and parallel to a tray element.

FIG. 24 depicts definitions of "control surfaces" that can be used in the invention in the modeling pressure drop between trays in the presence of liquid on a tray.

FIG. 25 shows additional detail definitions that can be used in modeling drowned liquid entry at a tray FIGS. 26a-26d depict various conditions and definitions that can be supported by the arrangements of FIGS. 24 and 25.

FIG. 34 depicts a contro theory representation of a bilinear system.

FIGS. 35a-35b depict an example of a reachable set of points within the reach of the system dynamics that begins with a convex connected region (FIG. 35a) but evolves to include a hole, thus defining forbidden states (FIG. 35b).

DETAILED DESCRIPTION

In the following descriptions, reference is made to the accompanying drawing figures which form a part hereof, and which show by way of illustration specific embodiments of the invention. It will be understood by those of ordinary skill in this technological field that other embodiments may be utilized, and structural, electrical, as well as procedural changes may be made without departing from the scope of the present invention.

Furthermore, in the figures, it is to be understood that a significant emphasis has been placed on depicting functionality, structure, and methods regarding many aspects of the invention. In choosing this emphasis, little treatment of aesthetics and visual appeal has been included. It is to be understood that a number of additional techniques of encasement, overlay bezel, alternate structure, ornamental embellishment, etc. can be used to obtain a wide range of aesthetic value and effect.

The present invention addresses the need for new tools for R&D in Reactive Distillation (RD). To begin a partial but representative listing of the many functional aspects of the invention is presented. The functional aspects of the invention include:

- Modular stages (for example, in the form of modular glassware) for lab-scale implementations of reactive distillation columns (and associated architectures);
- Modular stages (for example, in the form of modular glassware) fitted with special structure control options:
  - On/off and/or metered valves (automated or manual);
  - Tray parameters (magnetic servo) (to realize variable hold-up, for example),
  - Local thermal exchange;
- Modular stages (for example, in the form of glassware) fitted with special instrumentation options:
  - Temperature sensors in one or more locations (including 1-D & 2D temperature sensor arrays for spatiotemporal studies),
  - pH sensors,
  - Ion-specific sensors,
  - Spectroscopy sensors,
  - Fluid level monitoring;
  - Imaging sensors:
    - Video cameras and associated illumination,
    - IR cameras for thermal imaging,
    - UV cameras and associated illumination for spectral absorption and emission imaging;
    - gas/liquid flow-rate measurements;
- Computer interfaces for control and monitoring;
- Instrumentation support/analysis software:
  - Real-time statistical analysis,
  - Real-time image analysis/recognition,
  - Calculation of implied variables from measured data;
- Control algorithm library;
- Integration of real-time simulation w/ real-time monitoring.

Figure 8A:
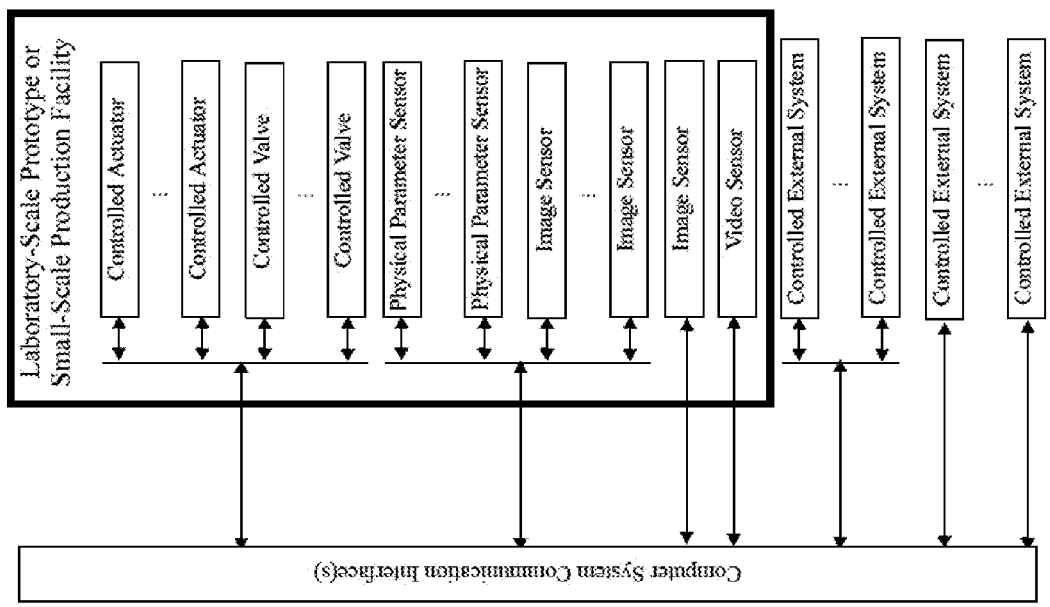

FIG. 8a depicts an example arrangement of some of the functional aspects of the RD innovations provided by the invention. As depicted in the figure, the invention provides for a laboratory-scale prototype, research set-up, or small-scale production facility comprising a modular structure (for example, in the form of modular glassware), each of which may in turn comprise one or more attachable or built-in sensors, controllable actuators, computer interfaces, and adjustable internal structures. For example, controllable mechanical actuator elements (such as tray configuration mechanisms, sensor positioners, internal valves, etc.) can be operated by moving mechanical components through glass under the influence of externally provided electromagnetic coupling, and these moving mechanical components can be encapsulated in glass so as to prevent chemical interactions and attack. Through use of controlled magnetic field (for example as controllable produced by magnetic fields, internal electronics and power distribution can be minimized or not required. Simple electrical structures within the modular stages may be powered by transformer action wherein internal wire coils are magnetically coupled to external coils of wire to form a transformer through a glass or high-temperature polymer wall comprised by the modular stage.

Simple electrical sensors can be interfaced by direct electrical interconnection through the wall of a modular stage, or can in some circumstances be carried optically or by magnetic field via similar transformer arrangements. Although image sensors could be internally positioned within a modular stage, modular stages can alternatively provide optical transmission paths from internal areas to or through an optical transmission area on the walls of modular stage.

The controllable actuators can be connected to driver electronics (for example, power transistors). In an embodiment, these are in turn interfaced with logic circuitry or digital-to-analog converters as appropriate. Associated electrically-controlled valves for fluid and gas flows in and out of the modular stage can also be interfaced with the same or similar electronics. These may in turn be directly connected (directly or indirectly) to a computer system, or may connect through the computer system through a local communications network such as $I^2C$, 1-Wire®, etc. Physical parameter sensors within or interfacing with a modular stage can be used to sense quantities such as temperature, ion concentration, pressure, pH, light absorption, etc. The electrical outputs of these physical parameter sensors can be interfaced with logic circuitry or analog-to-digital converters as appropriate. These may in turn be directly connected (directly or indirectly) to a computer system, or may connect through the computer system through a local communications network such as $I^2C$, 1-Wire®, etc.

For an assembly of modular stages, there can be one or more local communications network such as $I^2C$, 1-Wire®, etc. for use in interfacing with controllable actuators and sensors—for example FIG. 8a depicts two such networks, but there could readily be a single network or more networks, In the case of multiple networks, interconnections can be grouped in some sort of categorization (for example, FIG. 8a shows an example partition between control elements and sensor elements) or can be attached to a specific one of a plurality of networks by geometric layout dictates, network capacity, etc. Low-bandwidth image sensors may also be connected to such networks. Other image and video-rate sensors may connect directly to the computer system.

An assembly of modular stages may also be supported by one or more external controllable systems (for example, such as heaters, heat-exchangers, pumps, etc.). The control signals controlling these can be directly connected (directly or indirectly) to a computer system, or may connect through the computer system through a local communications network such as $I^2C$, 1-Wire®, etc. The local communications network can be shared with the assembly of modular stages, or can comprise one or more separate local communications networks.

The invention provides for the laboratory-scale prototype, research set-up, or small-scale production facility (such as depicted in FIG. 8a to interface with a broader computer system. FIGS. 8b-8f depict representative examples of arrangements provided for by the invention.

Figure 8B:
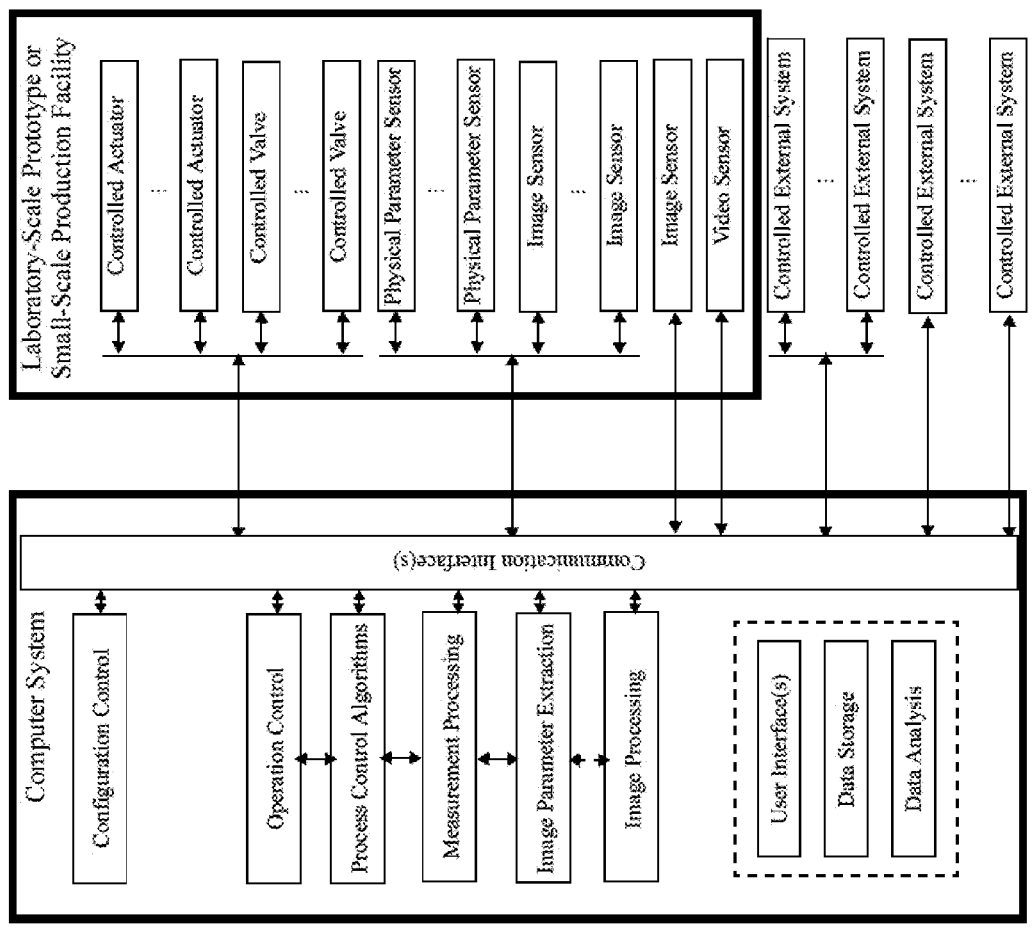

FIG. 8b depicts an example basic-level computer system for interconnection and use with an assembly of modular stages such as the exemplary arrangement depicted in FIG. 8a. The depicted computer system comprises one or more communications interface(s) for interconnection with an assembly of modular stages such as the exemplary arrangement depicted in FIG. 8a. The depicted computer system can further comprise user interface software and data storage software. In an embodiment, the depicted computer system can further comprise data analysis software. In various embodiments, the user interface software, data storage software, and/or data analysis software may be in communication with one another, the communications interface(s), and any one or more of the articles of software described below.

Should the assembly of modular stages have electrical controllable aspects influencing its configuration, the depicted computer system can comprise software for controlling these electrical controllable configuration aspects of the assembly of modular stages.

Should the assembly of modular stages have electrical controllable aspects influencing its operation, the depicted computer system can comprise software for controlling these electrical controllable aspects of the assembly of modular stages. Should the assembly of modular stages have one or more physical parameter sensors, the depicted computer system can comprise software for processing measurement data provided by these physical parameter sensors. In an embodiment, the system can provide direct measurement data and/or processed measurement data to process control algorithms running on the computer system so as to produce control signals for controlling the assembly of modular stages.

Should the assembly of modular stages be arranged to provide one or more image sensors or video-rate sensors, the depicted computer system can comprise image processing software for processing image data provided by these sensors. In an embodiment, the system can comprise image parameter extraction software to produce derived image parameter measurement signals. In an embodiment the derived image parameter measurement signals are provided to process control algorithms to product control signals for controlling the assembly of modular stages. In an embodiment the image parameter extraction software can be provided image data directly from image sensors. In an embodiment the image parameter extraction software can be provided processed image data produced by the image processing software.

Figure 8C:
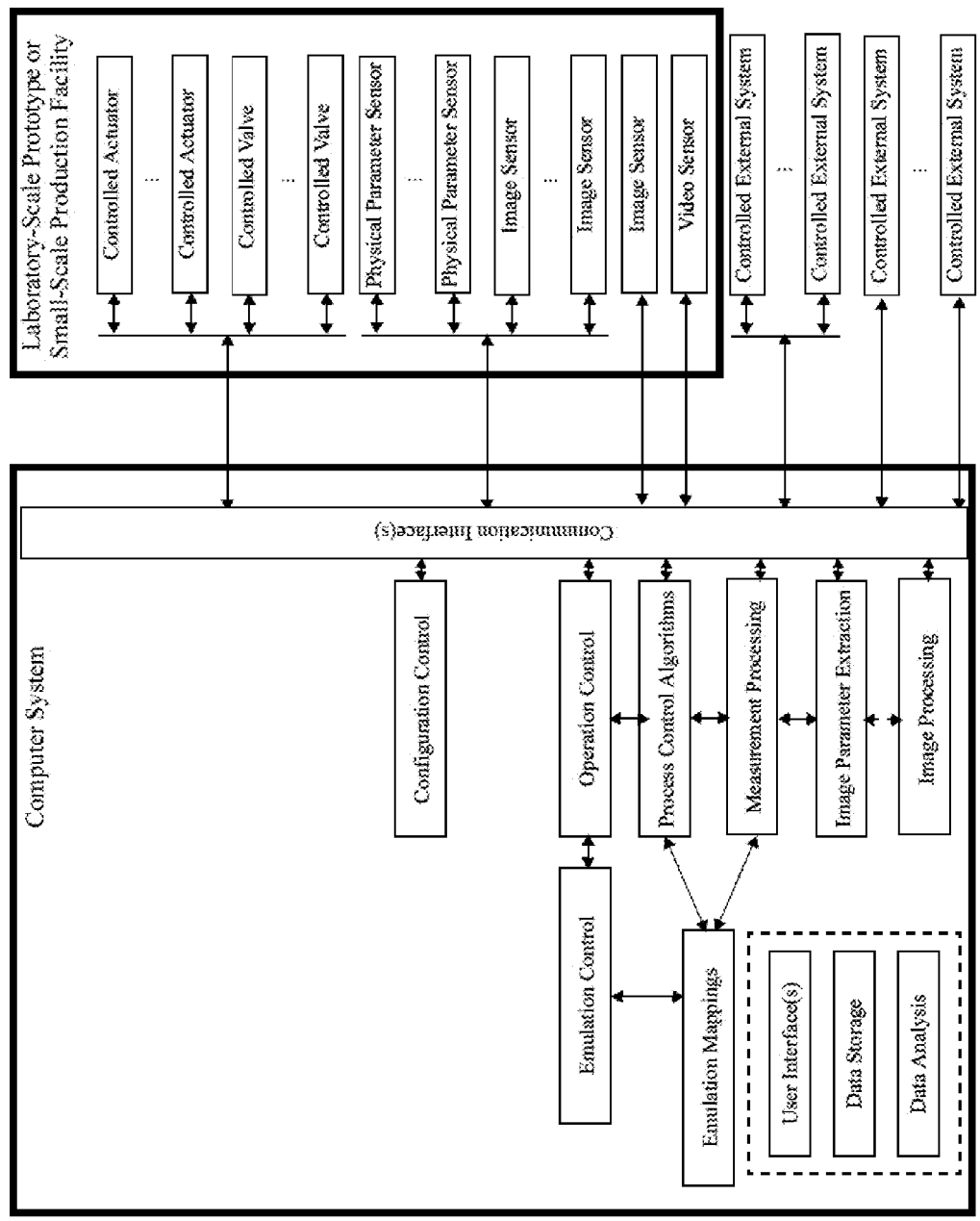

FIG. 8c augments the example arrangement of FIG. 8b with an example software arrangement for operating the prototype and interpreting its behavior as if it were a larger-scale system. In this augmented arrangement, an article of software is provided for control of the emulation, and another article of software is provided for mapping measurement data and control parameters of the actual operating assembly of modular stages. In various embodiments, the user interface software, data storage software, and/or data analysis software can be in communication with one or both of these articles of emulation software.

Figure 8D:
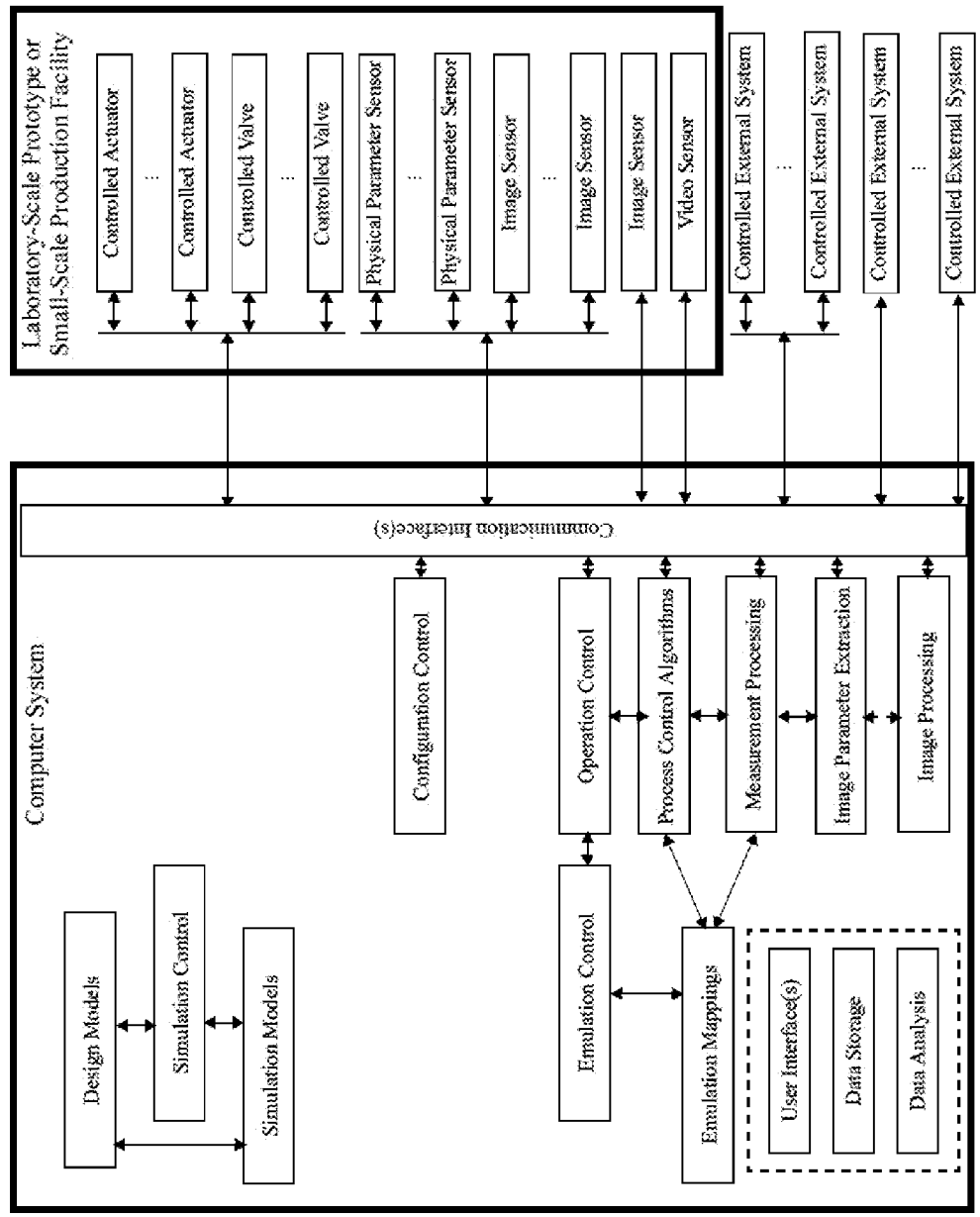

FIG. 8d augments the example arrangement of FIG. 8c with at least one article of software providing one or more numerical models for RD system design and one or more numerical models for RD system simulation. In an embodiment, the simulation software is controlled by simulation control software. In an embodiment, the simulation control software is in communication with design model software. In an embodiment, the simulation software is controlled by simulation control software. In an embodiment, the simulation software is in communication with design model software.

Figure 8E:
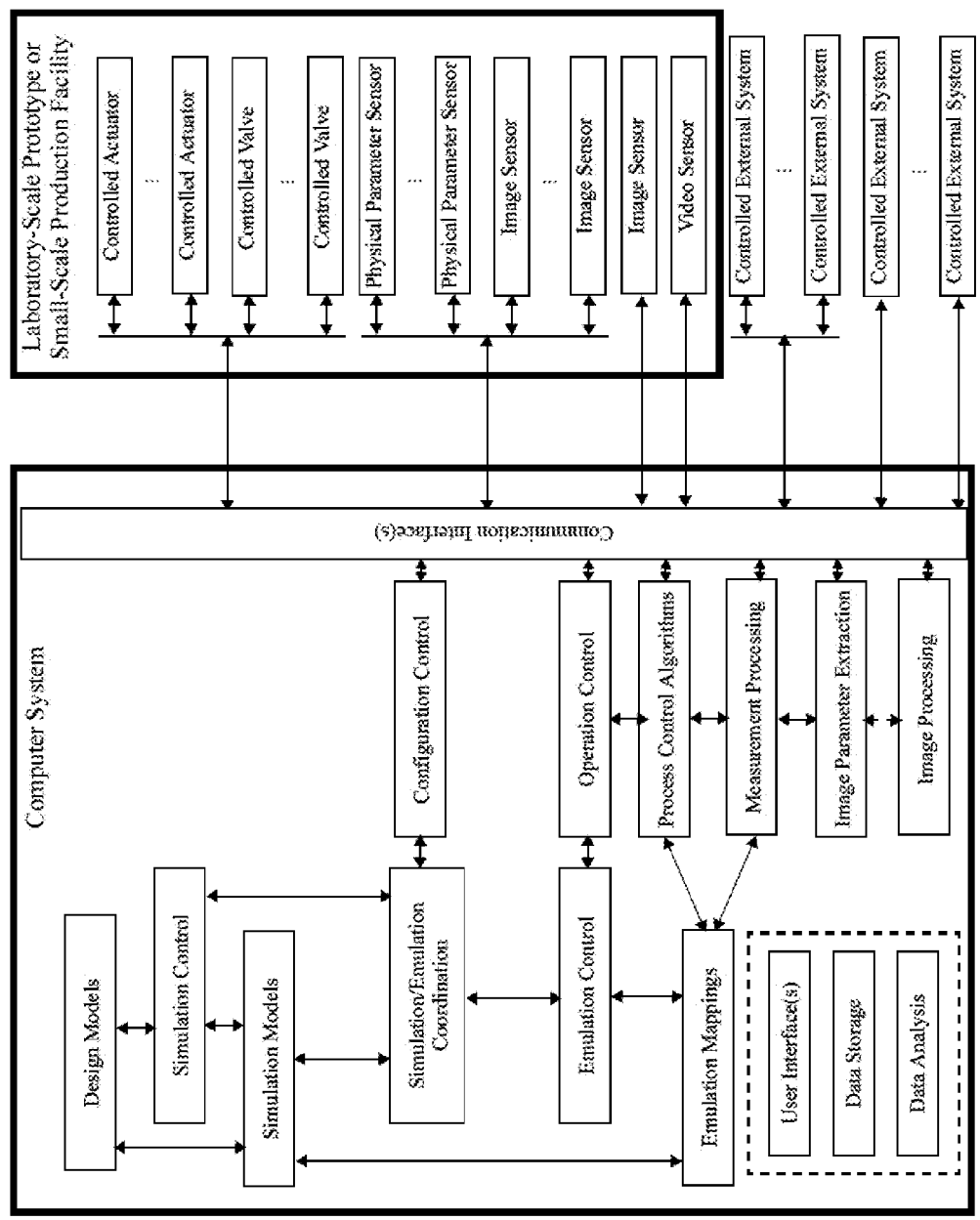

FIG. 8e connects and expands the software and capabilities of the example arrangement of FIG. 8d with coordination software for coordinating numerical simulations with process emulation built around the operation of the assembly of modular stages. In an embodiment, such simulation/emulation coordination software is in communication with emulation control software. In an embodiment, simulation modeling software is in communication with emulation mapping software.

FIG. 8f shows another configuration provided for by the invention that simply provides one or more of design and simulation models without interfacing with an assembly of modular stages. Here the computer system at least one article of software providing one or more numerical models for RD system design and one or more numerical models for RD system simulation. In an embodiment, the simulation software is controlled by simulation control software. In an embodiment, the simulation control software is in communication with design-oriented modeling software. In an embodiment, the simulation software is controlled by simulation control software. In an embodiment, the simulation software is in communication with design-oriented modeling software.

The above overview of the invention and explicit treatment many of its features now complete, attention is directed to additional details and features, and applications. Attention is first directed to modular RD column elements and clamping arrangements.

Modular RD Column Elements and Clamping Arrangements

In an embodiment the invention provides for a range of modular RD column elements and associated high-performance connecting clamp mechanics for use in the laboratory and small-scale commercial production system such as can be employed to manufacture limited-demand specialty and fine chemicals. Unlike closed multistage glassware elements (for example 5-stage or 10-stage glassware Oldershaw columns), the modular stages provided for by the invention can be structured to permit introduction, exchange, and replacement of packing elements, trays, sensors, mechanical actuators, and other components internal to a column. FIG. 9a shows an exemplary modular stage to which internal elements can be inserted and fitted.

Additionally, the modular stages provided for by the invention can be structured to permit additional fluid and gas connection points that can serve as inlets/feeds or outlets/draws for fluids and gasses. FIG. 9b shows an exemplary variation on the modular stage of FIG. 9a providing an example of such a connection point 901, although it is understood that many variations are possible. The depicted connection point 901 shown is one compatible with slip-over flexible tubing connections, but other arrangements (such as ground-glass joints, threaded joints, etc.) are possible and anticipated by the scope of the invention. The modular stages may be made of various types of materials, for example glass, ceramic, film-coated metals, or plastics capable of withstanding associated temperatures, pressures, chemical attack, physical shock, temperature gradients, etc.

The example modular stages of FIGS. 9a and 9b can be fitted with various internal elements as described above. A key example of this is a distillation tray element. FIGS. 9c-9f depict iconic representations of a variety of different types of distillation tray elements that can be securely fitted within the example modular stages such as those of FIGS. 9a and 9b. FIG. 9g depicts a representative more complex tray element that can be securely fitted within the example modular stages of FIGS. 9a and 9b. As an example of how these may be combined, FIG. 9h depicts the modular stage of FIG. 9a fitted with the tray style 910 represented by FIG. 9d. Similarly, FIG. 9i depicts the modular stage of FIG. 9a fitted with the more complex tray arrangement 920 represented by FIG. 9g. As yet another example, FIG. 9j depicts the modular stages of FIG. 9b fitted with the tray style 930 represented by FIG. 9c.

The trays can be simple fixed forms, more complex fixed forms, or can contain internal structures that can mechanically move. In an embodiment, such mechanically movable internal structures can be selectively positioned under the control of externally provided magnetic field, for example as can be provided by an electromagnetic coil operated under electrically-switched or computer-driven electrical control. In an embodiment, such mechanically movable internal structures can be used to adjust or reconfigure the operation of a tray element as will be discussed.

Figure 2:
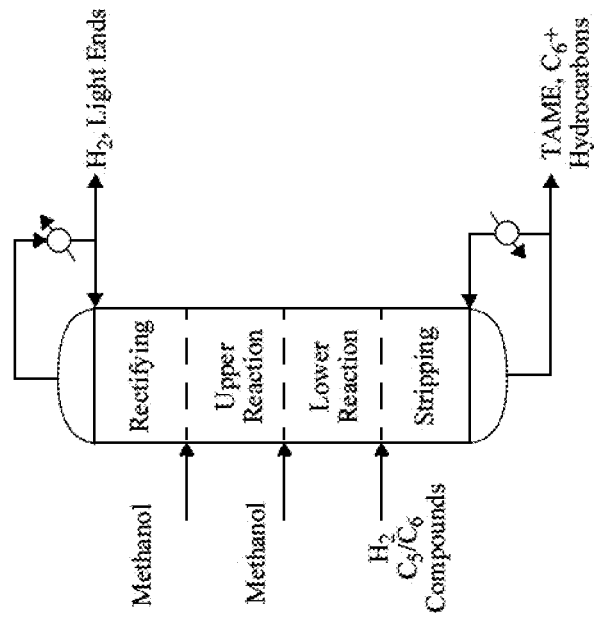
FIG. 2 depicts a representation of the Hickey and Adams TAME RD apparatus (from [5]).
Figure 1:
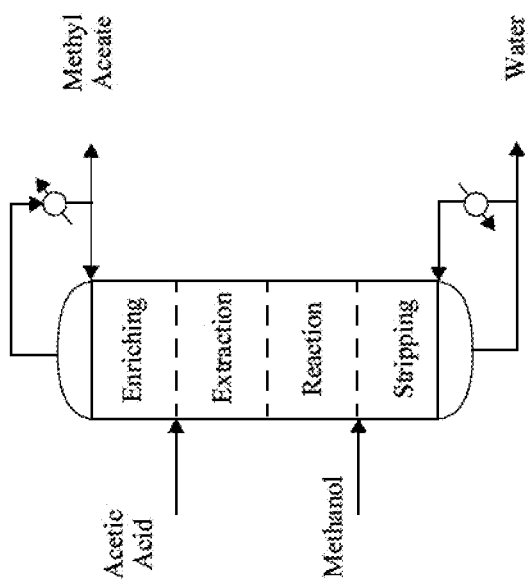
FIG. 1 depicts a representation of the Eastman Chemical methyl acetate RD apparatus.
Figure 3:
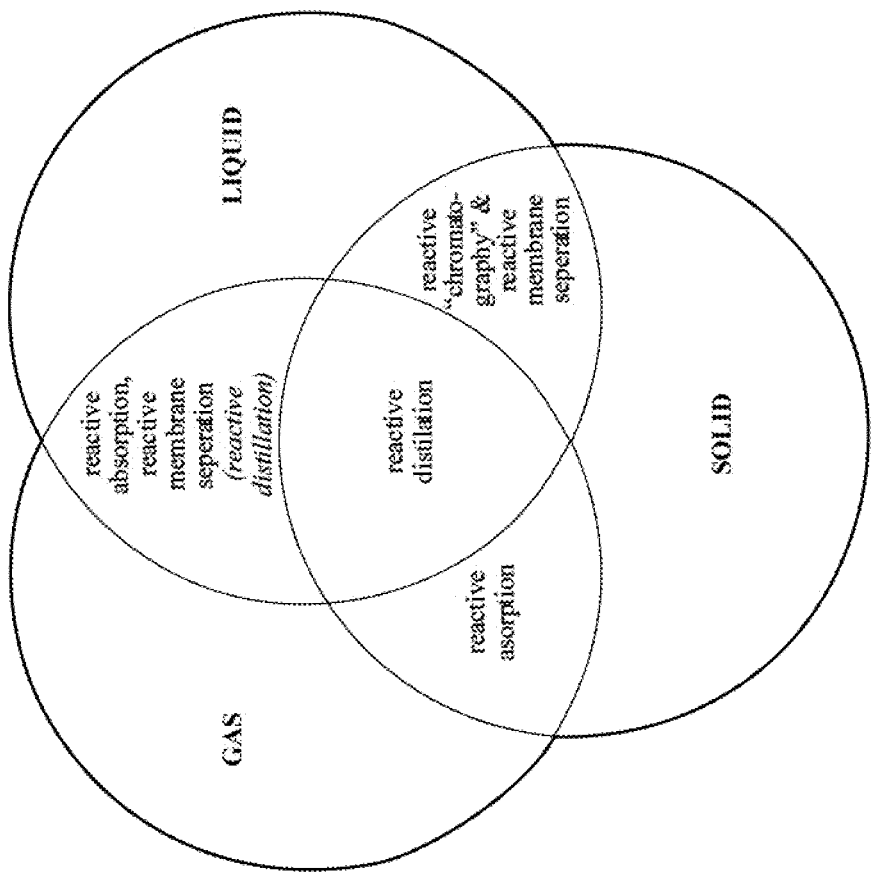
FIG. 3 (adapted from Aida & Silverston [6] and somewhat expanded) depicts separating reactor systems differentiated according to phases of reactants, catalysts, etc.
Figure 4B:
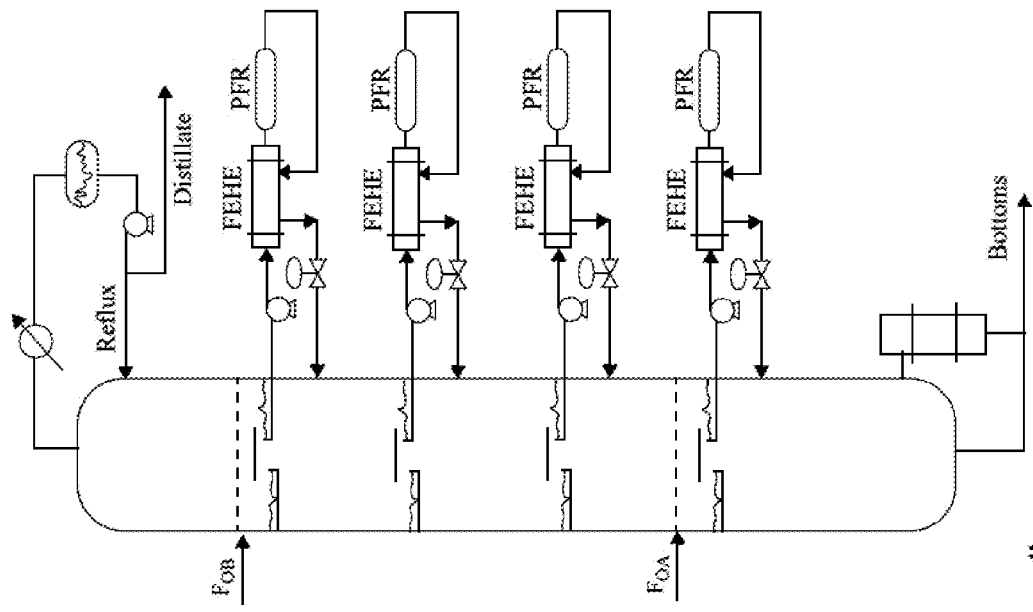
FIG. 4b depicts an RD column with a plurality of side reactors further supported by heat-exchange FEHE elements so as to reduce the size of side reactor vessels.
Figure 4A:
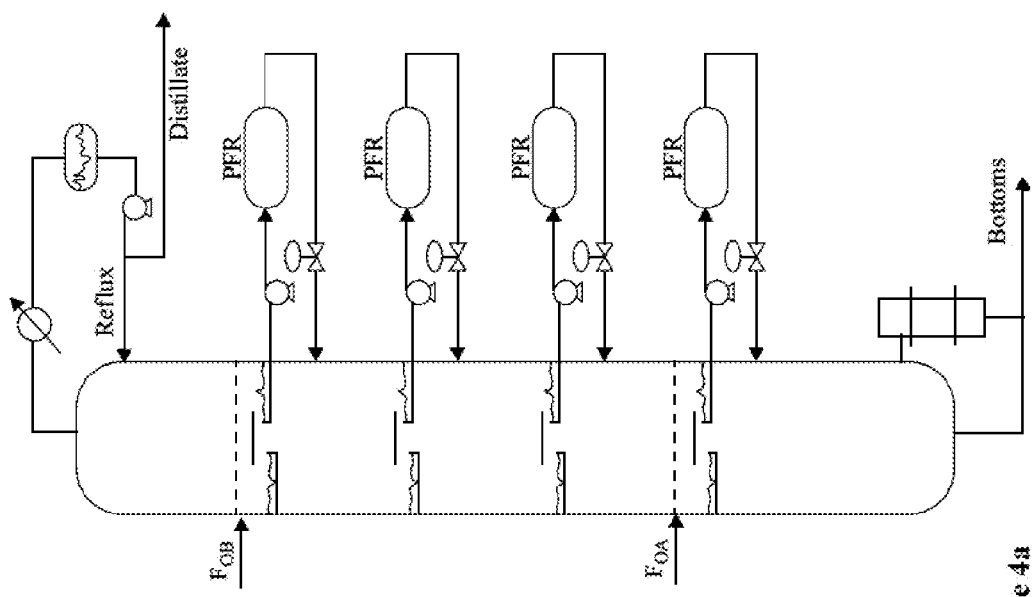
FIG. 4a depicts an RD column with a plurality of side reactors without FEHE elements.

A plurality of modular RD column elements can be linked together in combination to create a larger assembly comprised of modular RD column elements. In an embodiment, each modular RD column element has at least one physical interface for connection with the physical interface of another modular RD column element. In an embodiment, pairs of individual modules can be connected together at physical interfaces and held together by clamps. In an embodiment, at least one type of modular RD column element comprises two physical interfaces so as to permit three or more modular RD column elements to be linked to form a tandem lineage of the three or more modular RD column elements. For example, the modular elements of FIGS. 9a, 9b, 9h, 9i, and 9j comprise two such two physical interfaces 900a-900b, while the modular elements of FIGS. 10a, 10b, and 10c comprise one such physical interface 1000. FIGS. 11a and 11b depict representative stacks of multiple modular elements 1101-1108 and 1111-1124 of various types combined in tandem to form at least portions of (experimental laboratory-scale or small-scale production) distillation columns. FIGS. 11a and 11b are intended to be largely representational so as to show how the modular stages can be assembled into large structures. Typically a column will comprise many more modular stages than the number depicted in the figures. However, modular stage assemblies of this scale without the internal tray elements can also serve nicely as side reactor elements (for example as employed in the examples of FIGS. 4a and 4b).

Figure 12:
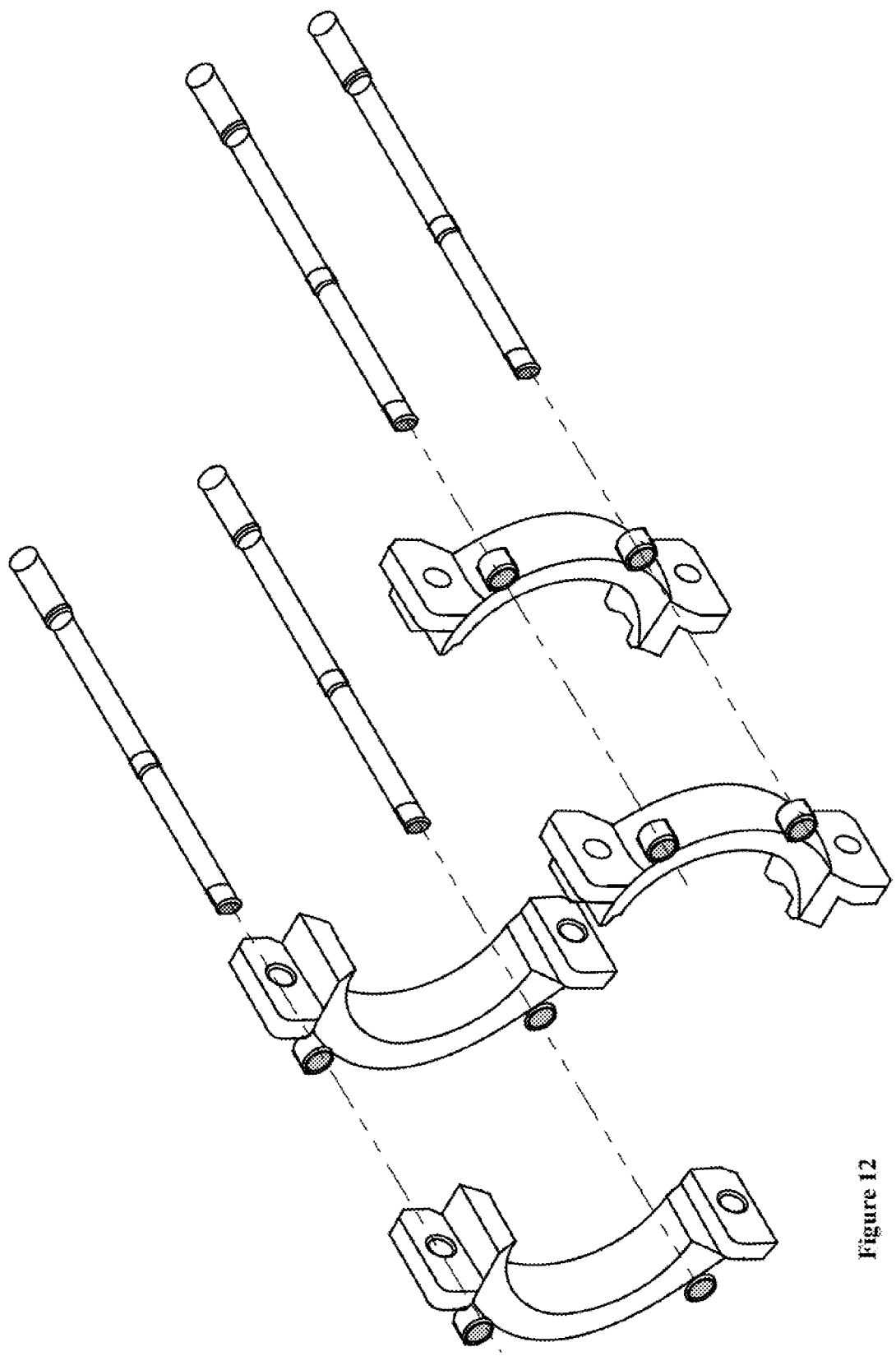
FIG. 12 depicts an example clamping arrangement that can be used to securely join adjacent modular stages together in a leak-proof arrangement capable of withstanding relatively high temperatures and pressures.

FIG. 12 depicts an example clamping arrangement that can be used to securely join adjacent modular stages together in a leak-proof arrangement capable of withstanding relatively high temperatures and pressures. Many other clamping arrangements are of course possible and are anticipated for use with the invention.

Trays

A tray in a long distillation column essentially acts as an isolated separate simple distillation column. A sequence of trays vertically spaced within a vertical distillation column thus acts as a cascade of isolated distillation columns, each contributing a step of a larger separation. In principle, a greater number of trays in a column results in a higher degree of separation performance. In practice this is true within reasonable limits and additionally the column's separation performance also depends heavily on the type, design, and parameters of the trays used.

Figure 13:
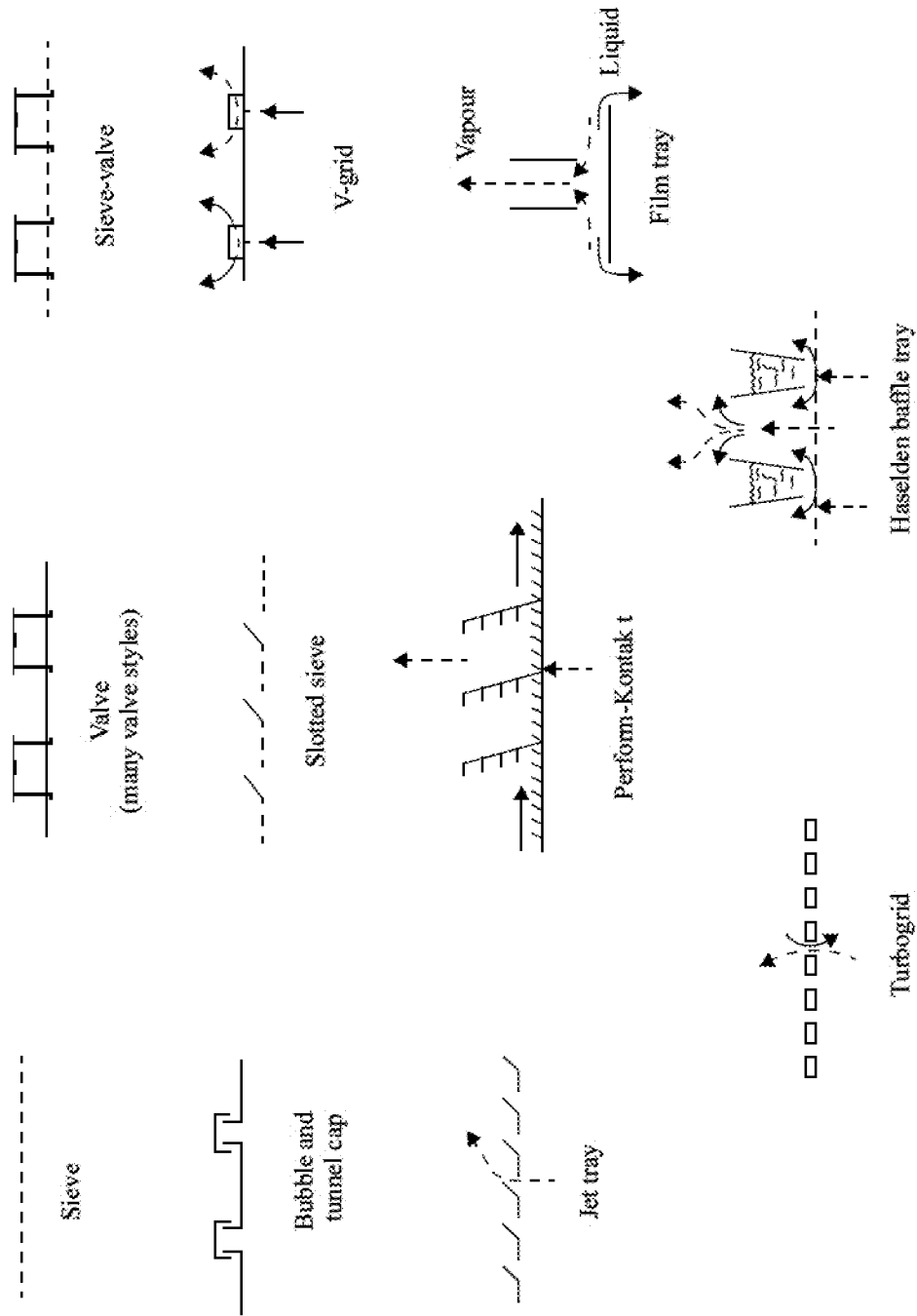
FIG. 13 (adapted from Lockett [3] and Doherty & Malone [5]) depicts a few representative distillation tray designs.
Figure 14C:
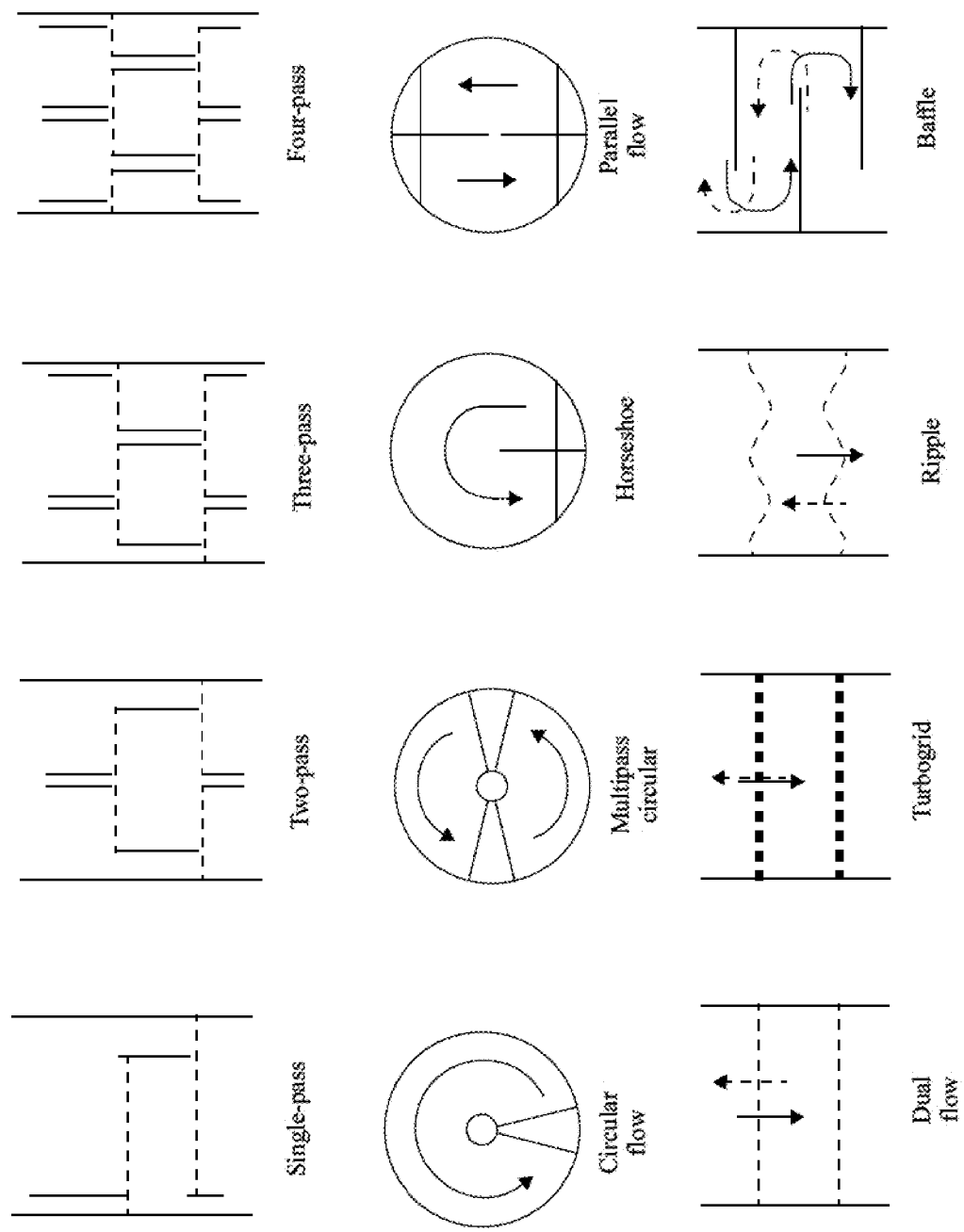

A major design element in distillation columns is the type, number, placement, and parametric details of distillation trays within the column. Two important design and performance references are Lockett [3] and the American Institute of Chemical Engineers *Bubble Tray Design Manual* [12], although excellent treatments are found in many books (such as Doherty & Malone [5]). There are a wide variety of types of distillation trays and structures within and in some cases attached to them, each with is own set of advantages and disadvantages in various situations as well as parametric details, design methodologies, models, and heuristics. For example FIG. 13 (adapted from Lockett [3] and Doherty & Malone [5]) depicts a few representative distillation tray designs while FIGS. 14a-14c depict a few representative inter-tray flow arrangements and associated tray designs employing them.

As described above, the invention provides for a variety of different types of distillation tray elements to be chosen and securely fitted within the example modular stages such as those of FIGS. 9a and 9b. Also as described above, the invention provides for trays to contain internal structures that can mechanically move and can be selectively positioned under the control of externally provided magnetic field, for example as can be provided by an electromagnetic coil operated under electrically-switched or computer-driven electrical control.

Such mechanically movable elements within or associated with a tray can be used to adjust or reconfigure the structure and operation of a tray element under computer control. These mechanically movable elements can also be used to induce new types of control in the form of various types of controlled modulations, for example:

Inter-tray liquid flow modulation;
Inter-tray vapor flow modulation;
Zone temperature modulation via controllable heat exchange;
Variable holdup modulation;
Catalysis surface area modulation;
Inert dilution modulation.

In an embodiment such a mechanically movable element can be moved directly by a magnetic field. In another embodiment a mechanically movable element can be moved indirectly via an actuator that is selectively moved by a magnetic field. In an embodiment said moving components are encapsulated (for example in glass, ceramic, or chemically and thermally resistant plastic) so as to prevent chemical interactions and attack. In an embodiment mechanical actuator elements can be operated by moving components through glass under the influence of externally provided electromagnetic coupling produced by an external electromagnetic coil that is electrically controlled by a computer.

In one approach, such mechanically movable elements or their actuators can be "memoryless" and respond directly to the applied magnetic field. In another approach, such mechanically movable element or their actuators can have "mechanical memory" and retain a state after the magnetic field is removed, for example, via the use of latch or ratchet mechanisms. In an embodiment, linear or rotational stepper motor arrangements providing a moderate to large number of "digitally" selected preset positions can be implemented in this way.

As a first example, a magnetically controllable bubble-cap tray arrangement is described. Although not explicitly discussed, the same general approaches can also be applied in a similar manner to a valve tray.

As background, FIGS. 15a-15c depict general operation and features of a representative bubble-cap tray as used in distillation columns. It is noted that other types of bubble-cap trays are known, for example comprising various venting arrangements, and some of these other types have significant variation from that about to be described. In FIG. 15a, the weight of the movable caps 1501a-1501b is drawn by gravity to seal associated vertical riser ports 1502a-1502b. As pressure from fluids, vapors, and gasses builds, force is applied to the bottom of the moveable caps and when such pressure is sufficiently high as to overcome the force of gravity that cap lifts as suggested in FIG. 15b. In a hypothetical extreme, pressure from fluids, vapors, and gasses can become so great that the caps can be lifted to the end of movable travel as suggested in FIG. 15c; bubble-cap tray design and use includes provisions either to avoid this condition or in some applications to perform some sort of compensation action (for example, activate or expose a relief vent).

FIG. 16a depicts a representative bubble-cap tray element as provided for by the invention. FIG. 16b shows the bubble-cap tray element 1601 of FIG. 16a positioned within a modular stage 1602 as was aforedescribed for general types of tray elements. In one embodiment, the movable bubble-cap elements are made of ferromagnetic or magnetic material. In another embodiment, the movable bubble-cap elements are capped or otherwise comprise a volume of ferromagnetic or magnetic material. For example, the arrangement of FIGS. 16c and 16d show an illustrative case where the tops 1610a-1610b of the bubble-caps internally comprise ferromagnetic material as does the surface of the tray. In FIG. 16c the ferromagnetic material on the surface of the tray is not subjected to a magnetic field and thus asserts no magnetic attractive force on the ferromagnetic material in the bubble-caps, and the bubble caps operate with only gravity (or in some embodiments, spring material, although not pictured) as the opposing force to the force asserted by pressure from fluids, vapors, and gasses. In FIG. 16d the ferromagnetic material on the surface of the tray is actively subjected to a magnetic field and thus asserts an attractive magnetic force on the ferromagnetic material in the bubble-caps in opposition to the force asserted by pressure from fluids, vapors, and gasses.

In one embodiment, a controllable magnetic field takes on only two values, off and a maximal value, thus selectively freeing the bubble caps to move or locking them into a specific position. When the caps are locked, other parallel orifices, weirs, etc. can be used. In an implementation, magnetic materials may be used in the caps so that the caps can be selectively attracted or repulsed. One set of caps (or other orifice-associated actuator) can be magnetically locked when the applied magnetic field is of one pole while another set caps (or other orifice-associated actuator) can be magnetically locked when the applied magnetic field is of the opposite pole. When no magnetic field is applied, neither set of caps (nor other orifice-associated actuator) is locked.

In another embodiment, a controllable magnetic field takes on a plurality of non-zero intensities (rather than just maximal). In such an arrangement, the resisting force on the caps induced by the magnetic field can be varied among a broader range of values, effectively controlling a pressure-resistance parameter of the bubble tray as a function of the current applied to an electromagnetic coil. It is also noted that the previous-mentioned (off and maximal value) embodiment can also be controlled in this manner using pulse-width modulation. In such an implementation, the higher the duty-cycle of the pulse waveform, the stronger the magnetic attraction of the caps to the tray that is driven by the controlling magnetic field. Such a pulse-width modulation approach however can emit a great deal of at least local radio-frequency (RF) energy that can interfere with other electromagnetic arrangements (powering, signaling, control, etc.) in the overall column and its general vicinity.

FIG. 16e depicts a representation of an electromagnetic coil that can be used to deliver a controllable magnetic field to the tray (as described above) or other magnetically-operated elements in a modular stage. FIG. 16f depicts a representation of the electromagnetic coil 1620 positioned against or permanently attached to the outside wall 1621 of a modular stage. In an embodiment, the electromagnetic coil is positioned against the outside wall of a modular stage and held there, for example, by a clamp (not shown in the figure) dedicated to that purpose. In another embodiment, the electromagnetic coil is positioned against the outside wall of a modular stage and held there by attachment (not shown in the figure) to a stage-joining clamp such as that depicted in FIG. 12. In another embodiment, the electromagnetic coil is positioned against the outside wall of a modular stage and held there by attachment (not shown in the figure) to fasteners associated with a stage-joining clamp such as that depicted in FIG. 12. In another embodiment, the electromagnetic coil is permanently attached to the outside wall of a modular stage.

As a second example, the size of perforations in a tray can be controlled by arrangement similar to a rotational stepper-motor (as described earlier). FIG. 17a shows an exploded view of a tray element comprising mating top 1700a and bottom 1700b open-surface caps, each of which exposes an associated perforated tray element 1701a-1701b. In this example the exposed associated perforated tray elements 1701a-1701b have a fixed position in the mated top and bottom cap assembly, and between these upper and lower exposed perforated tray elements is a rotating perforated tray element 1702. The perforations in the rotating perforated tray element and the upper and lower exposed perforated tray elements are such that when the rotating perforated tray element is rotationally positioned at least one setting all perforations are fully aligned for maximal flow through the perforated tray element, and when rotationally positioned in at least one setting all perforations are fully unaligned for minimal (or zero) flow through the perforated tray element.

Along the periphery of the rotating perforated tray element is a circumference-stuttered plurality of short bands of ferromagnetic or magnetic material. When a particular band of the ferromagnetic or magnetic material is in the vicinity of a sufficiently strong magnetic field, rotation force can be asserted to the rotating perforated tray element.

Figure 17B:
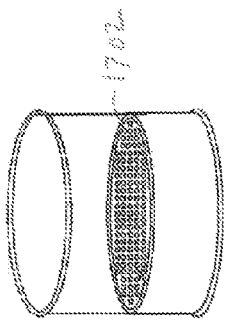
Figure 17C:
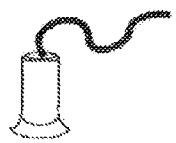
FIG. 17c depicts a representation of an electromagnetic coil that can be used to deliver a controllable and localized magnetic field to a narrow sector of the tray (as described above) or other magnetically-operated elements in a modular stage as needed for stepper-motor types of actuation.
Figure 17D:
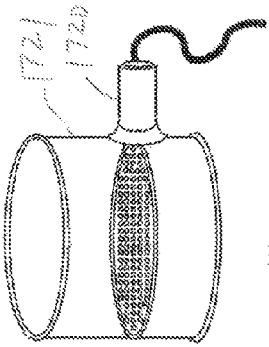
FIG. 17d depicts a representation of the electromagnetic coil positioned against or permanently attached to the outside wall of a modular stage.
Figure 17A:
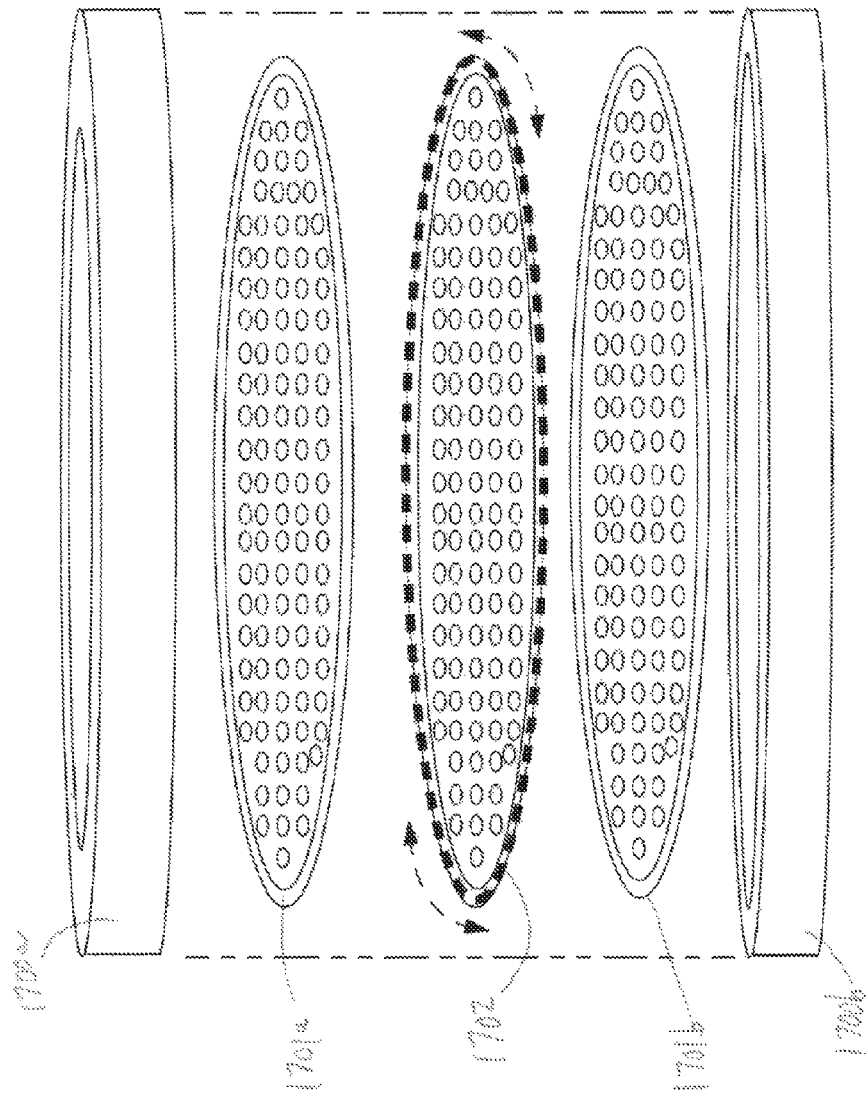
FIG. 17a shows an exploded view of a tray element comprising mating top and bottom open-surface caps, each of which exposes an associated perforated tray element.

FIG. 17b depicts a modular stage fitted with the tray element 1702 of FIG. 17a. FIG. 17c depicts a representation of an electromagnetic coil that can be used to deliver a controllable and localized magnetic field to a narrow sector of the tray (as described above) or other magnetically-operated elements in a modular stage as needed for stepper-motor types of actuation. FIG. 17d depicts a representation of the electromagnetic coil 1720 positioned against or permanently attached to the outside wall 1721 of a modular stage. In an embodiment, the electromagnetic coil is positioned against the outside wall of a modular stage and held there, for example, by a clamp (not shown in the figure) dedicated to that purpose. In another embodiment, the electromagnetic coil is positioned against the outside wall of a modular stage and held there by attachment (not shown in the figure) to a stage-joining clamp such as that depicted in FIG. 12. In another embodiment, the electromagnetic coil is positioned against the outside wall of a modular stage and held there by attachment (not shown in the figure) to fasteners associated with a stage-joining clamp such as that depicted in FIG. 12. In another embodiment, the electromagnetic coil is permanently attached to the outside wall of a modular stage.

Introducing Sensors into the Modular RD Stages

Another aspect of the invention provides for incorporating various types of sensors and sensor layouts (point, linear array, two-dimensional array, three-dimensional array) into modular RD stages. In an embodiment the invention includes at least localized temperature sensors into a modular stage. In an embodiment the invention includes at least localized pressure sensors into a modular stage. In an embodiment the invention includes at least localized ion sensors into a modular stage. In an embodiment the invention includes at least localized pH sensors into a modular stage. In one approach to the case of arrays and lattices, each sensor location comprises the same type of sensor. In another approach to the case of arrays and lattices, each sensor location comprises one or another of a plurality of types of sensors. In another approach to the case of arrays and lattices, each sensor location comprises a plurality of types of sensors. In various implementations the lattice can be regularly spaced or can have varied spacing so as to add spatial sensing detail near edges of trays, columns, orifices, etc.

As an initial example, FIG. 18 depicts an example of a two-dimensional lattice array of sensors built into a tray 1800, the tray itself positioned within a modular stage 1801 as described above. The tray can be passive (i.e, no moving internals) or can comprise controllable features. In an alternate embodiment, a two-dimensional lattice array of sensors can be implemented as a sparse overlay, such as will be described shortly, arranged so the sparse overlay is set atop of, or attached to, the surface of a tray element and does not appreciably interfere with the operation of the tray.

As another example, FIG. 19a depicts an example of a 1-dimensional linear array of sensors 1901-1907 integrated into a common housing 1900 to form a sensor submodule 1910. FIG. 19b depicts an example the sensor submodule 1910 of FIG. 19a positioned vertically along the interior wall 1920 of a modular stage 1930. Alternatively, a 1-dimensional linear array sensor submodule such as that depicted in FIG. 19a can be attached, perpendicularly, in parallel, or in other arrangement, to a tray. Additionally, as will be described, a 1-dimensional linear array sensor submodule such as that depicted in FIG. 19a can be attached to or inserted within distillation packing material.

As a further example, FIG. 20a depicts an example of a sparse two-dimensional lattice array of sensors 2001 integrated into a common tray-like housing 2002 to form a sensor submodule. FIG. 20b depicts an example of the use of two sensor submodules 2010a-2010b such as that depicted in FIG. 20a positioned along the interior wall 2020 of a modular stage 2030 on either side of and parallel to a tray element 2040. Additionally, as was described above, a sparse two-dimensional lattice array sensor submodule such as that depicted in FIG. 20a can be set atop of, or attached to, the surface of a tray element. In these circumstances, such a sparse two-dimensional lattice array sensor submodule and a tray to which it is overlaid or attached can be arranged so the sensor array does not appreciably interfere with the operation of the tray.

Packing

Packing in distillation columns is used as both a supplement to and as alternative to trays in columns. Traditional packing in a distillation column typically comprises a significant number of passive physical objects with shapes designed to increase the interfacial area for the contact of vapor and liquid. These objects are inserted between trays.

The invention provides for packing to be used within modular stages. For example, packing can be added to a region between trays before two modules are joined, as suggested by FIG. 21a.

There has been increasing application, interest, and study of the use of packing to improve separation performance by supplementing trays by packing material. The invention provides for packing to be used in regions 2100a-2100b between trays within coupled modular stages. For example, packing can be provided to a region between the tray of one module and the tray of another module before the two modules are joined, as suggested by FIG. 21a. FIG. 21b shows two regions 2110a-2110b in the arrangement of FIG. 11a where packing can be inserted between consecutive trays.

There has also been application, interest, and study of the use of packing to replace one or more consecutive groups of trays with a region of only packing. Differentiating terminology has emerged wherein sections of columns (or entire columns) comprising only packing are referred to as "continuous-contact" sections (or columns) while sections of columns (or entire columns) comprising only trays are referred to as "staged-contact" sections (or columns). The invention provides for packing to be used in place of trays within coupled modular stages. For example, FIG. 21c shows a modification of the arrangement of FIG. 11a wherein there are no trays and packing can be inserted throughout.

Figure 21C:
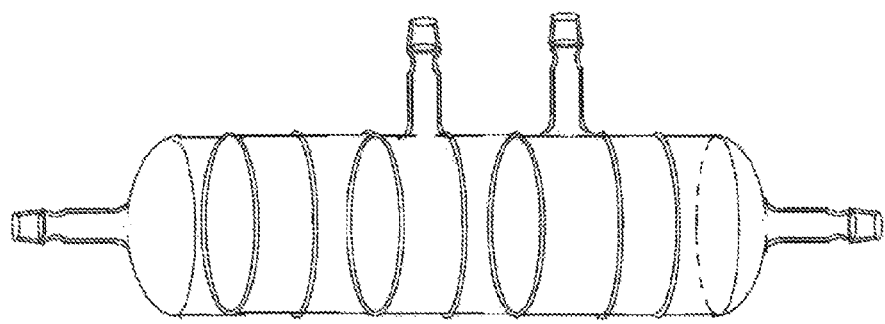
FIG. 21c shows a modification of the arrangement of FIG. 11a wherein there are no trays and packing can be inserted throughout. One or more packing support trays can be included.
Figure 21B:
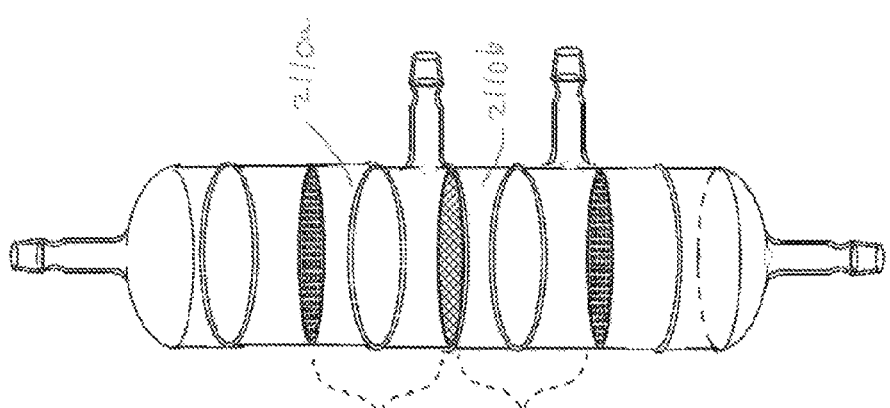
FIG. 21b shows two regions in the arrangement of FIG. 11a where packing can be inserted between consecutive trays.
Figure 21A:
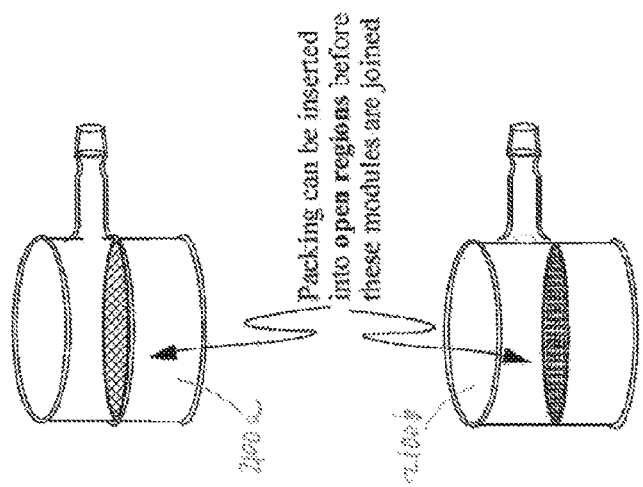
FIG. 21a shows how packing column packing material can be added to a region between trays before two modules are joined.

In situations with long regions of packing, such as that of FIG. 21c, it can be advantageous to include packing support trays which have limited influence on vapor and liquid interfacing and travel. For example, in the arrangement of FIG. 21c, a packing support tray can be introduced near the bottom of the column to support the packing, and one or more additional packing support trays can be employed higher in the column as advantageous.

Introducing Sensors into or Among Packing Elements

As mentioned above, a sensor submodule such as that depicted in FIG. 19a or FIG. 20a can be attached to or inserted within distillation packing material. More generally, the invention provides for incorporating various types of sensors (point, linear, array) into or among packing elements that can be used within the modular stages of the invention. For example, the invention provides for incorporating one or more temperature sensors into or among packing elements. The invention also provides for incorporating one or more pressure sensors into or among packing elements. The invention further provides for integrating other types of sensors (for example ion sensors, light absorbtion sensors or pH sensors) into or among packing elements.

Introducing Other Types of Actuators into Modular Stages

The invention provides for various other types of actuators in modular stages. In general, mechanical actuator elements can be operated by moving components through the wall of a modular stage under the influence of externally provided electromagnetic coupling. Such moving components can be encapsulated (for example in glass, ceramic, or chemically and thermally resistant plastic) so as to prevent chemical interactions and attack.

In one approach, such actuators can be "memoryless" and respond directly to the applied magnetic field. In another approach, actuators can have "memory" and retain a state after the magnetic field is removed, for example, via the use of latch or ratchet mechanisms. Linear or rotational stepper motor arrangements providing a moderate to large number of "digitally" selected preset positions can be implemented in this way. Other arrangements for supporting larger numbers of mechanical states include use of two or more independent magnetic pathways to control separate or related mechanisms within an element within a modular stage. For example, a movable fluid conduit could have its position controlled according to both a first "fine adjustment" magnetic path and a second a "course adjustment" magnetic path. As another example, a packing element can contain one or more actuators influencing the shape and quantity of its exposed surface area.

Introducing Light Sources into Modular Stages for Photochemical Reactive Distillation and Spectroscopy The invention provides for the introduction of and incorporation light sources in modular stages. Such light sources can be employed as a part of light absorption or other types of spectroscopy sensors. Light sources can be for example semiconductor or gas. Although silicon-based LED light sources have performance issues at high temperatures, other materials (for example industrial diamond LEDs) can operate well at high temperatures and are also capable of producing deep ultraviolet radiation at these temperatures of less that 240 nm. As an alternative to incorporating light sources fully within the column or side reactor, light may be introduced into modular stages through optical passageways that traverse the wall of the modular stage, for example using structures of quartz glass, specialized fiber optics, etc. Alternatively light may be introduced into modular stages through direct optical transmission through an appropriately optically-conductive wall of the modular stage.

The aforedescribed internal and external light sources can also be employed for photochemical stimulation of photo-inducted reactions in distillation processes. The latter approach, which can be termed "Photochemical Reactive Distillation," has only recently begun to receive attention [13]. The notion behind "Photochemical Reactive Distillation" is attractive since it provides both alternative chemistry processes (involving excited states and the production of reactive intermediates) to those involving thermal energy. Photochemistry can also operate at lower temperatures. Photochemistry can be introduced at one or more localized regions within the distillation column, within packing, in side reactors, or combinations of these. By using light of different wavelengths in shared or separated regions, additional design opportunities are made available for reactive distillation process design.

Similarly, light for spectroscopy can be introduced at one or more localized regions within the distillation column, within packing, in side reactors, or combinations of these. Use of light of different wavelengths in shared or separated regions, additional design opportunities for spectroscopy sensing embedded within the column or side reactor.

Controllable Valves and Valve Complexes

The invention provides for the electrical and computer control of one or more valves or valve complexes that can be connected directly or indirectly with the column as suggested earlier in conjunction with the discussion of FIG. 8a. The valves can be electrically controlled on-off valves, electrically controlled metering valves, and electrically controlled valve complexes comprising a plurality of path-connected electrically controlled valves. An approach to electrically controlled metering valves suitable for use with the invention is taught in the inventor's copending U.S. Provisional Patent Application 61/249,047 entitled "Plug, Ball, and Laboratory Stopcock Valves with Arbitrary Mapping of Flow to Rotation Angle and Provisions for Servo Control."

Figure 5:
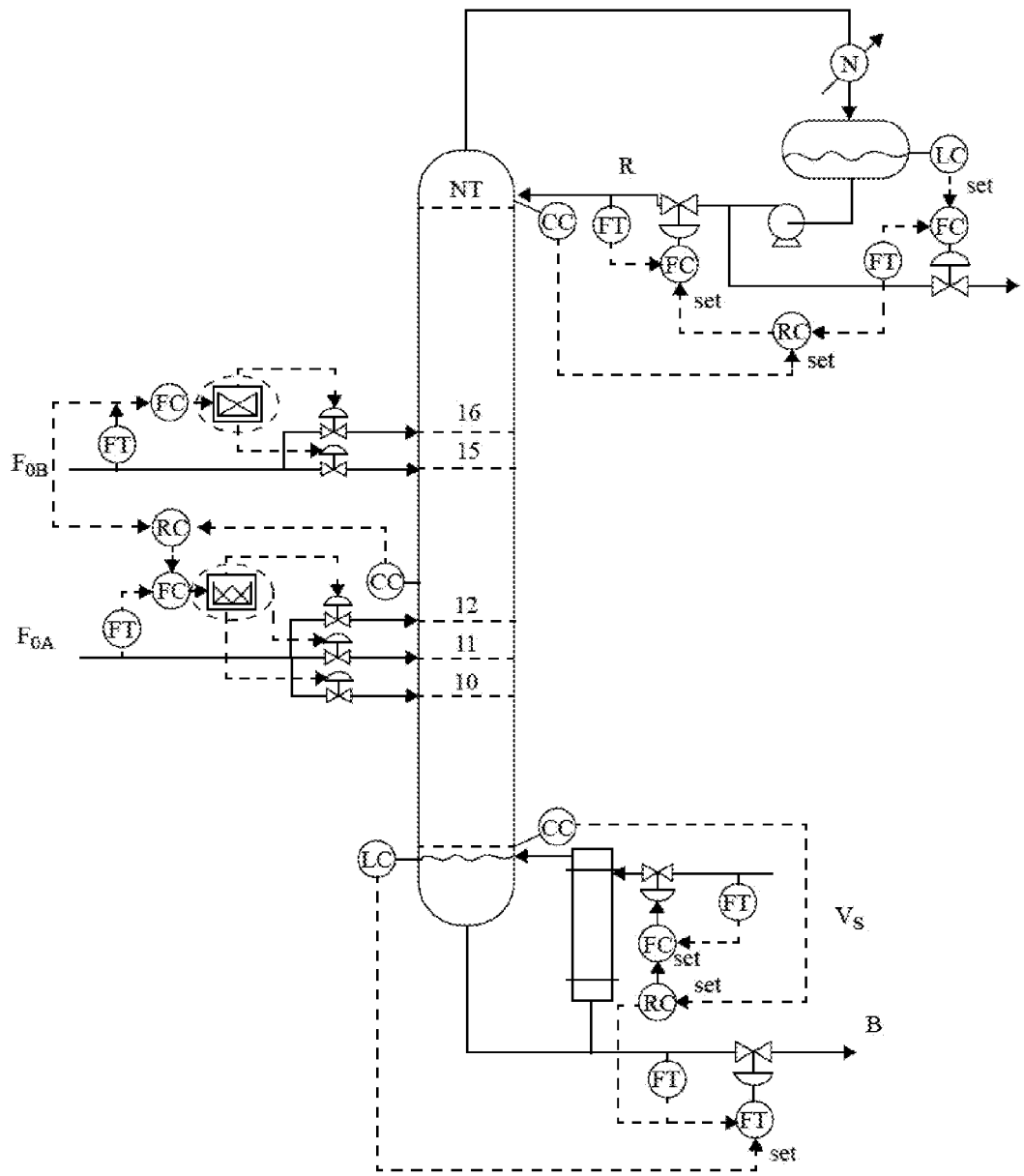
FIG. 5 depicts an RD column with variable feed location positions that can be controlled by valves.
Figure 6:
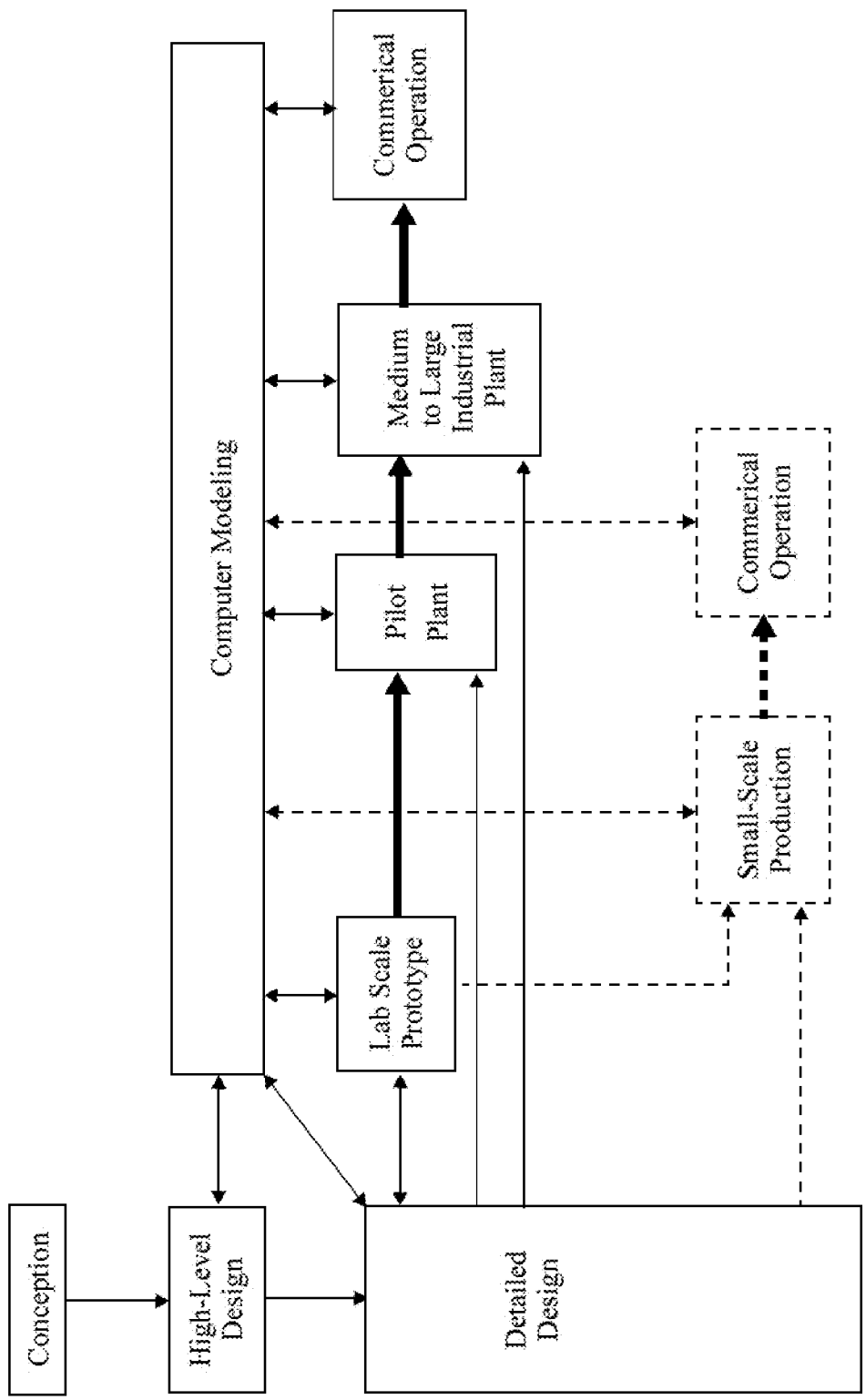
FIG. 6 represents an RD apparatus design process.
Figure 7:
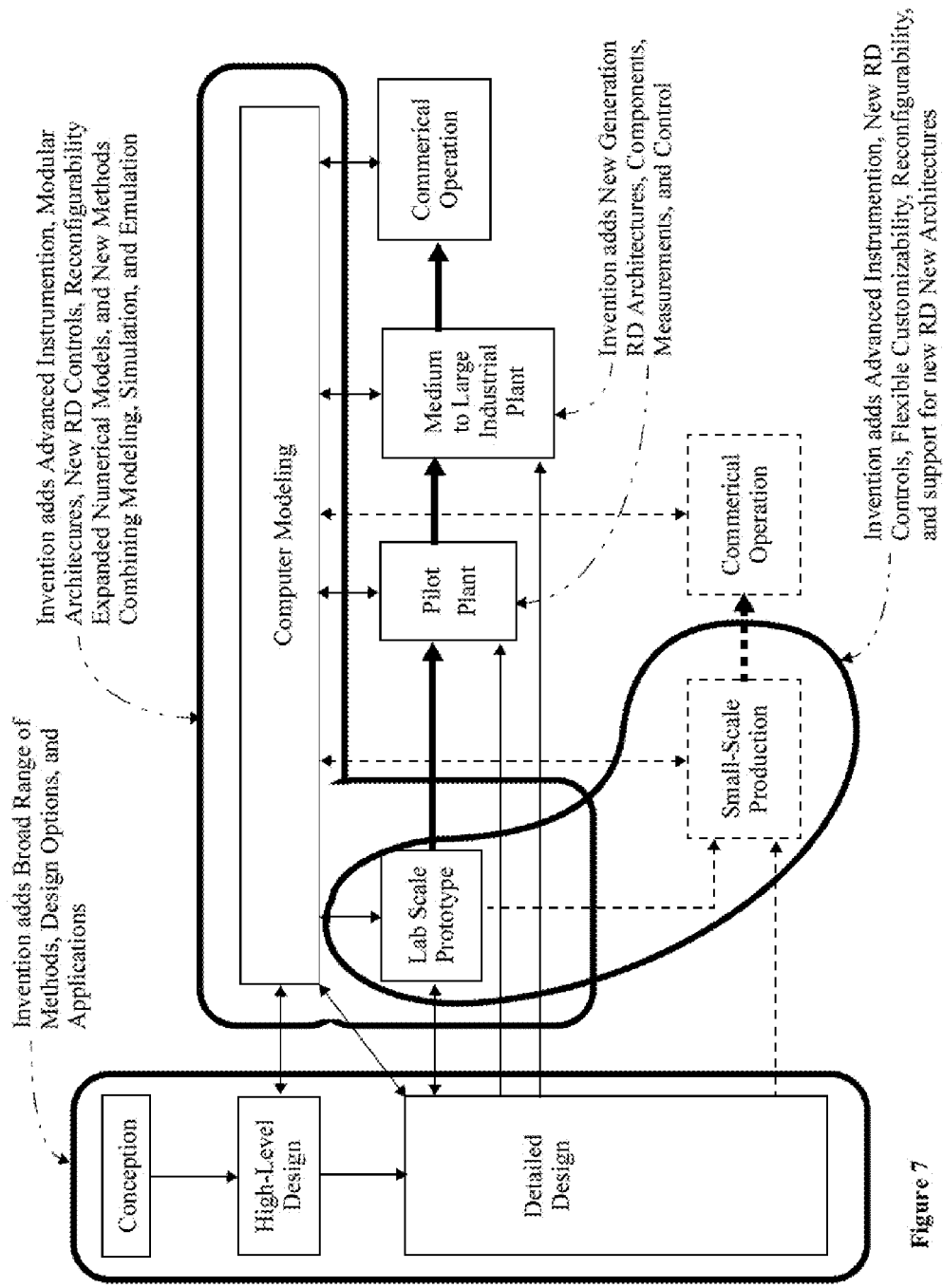
FIG. 7 represents some of the targeted value of some of the functional aspects of the RD innovations provided by the invention.
Figure 22A:
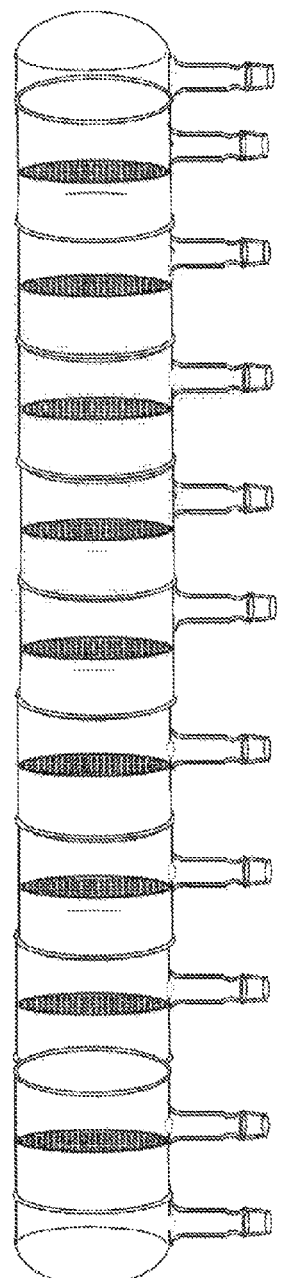
FIG. 22a depicts an arrangement assembled from modular stages in accordance with the invention for use in the implementation of controlled "variable feed locations" (aka "feed tray manipulation" and "coordinated control") as well as controlled variable takeoff location.

As an example of a valve complex, consider the apparatus depicted in FIG. 22a, assembled from modular stages in accordance with the invention, for use in the implementation of "variable feed locations" (aka "feed tray manipulation" and "coordinated control"). For example, FIG. 5 depicts an RD column provided with two variable feed positions, each of which can be controlled by a coordinated group of path-connected valves. In the example of FIG. 5, the top feed can enter at one or both of trays 15 and 16 while the lower feed can enter at one or more of trays 10, 11, and 12. In research studies and potential new types of control systems, more variable feed locations are of interest.

Figure 22B:
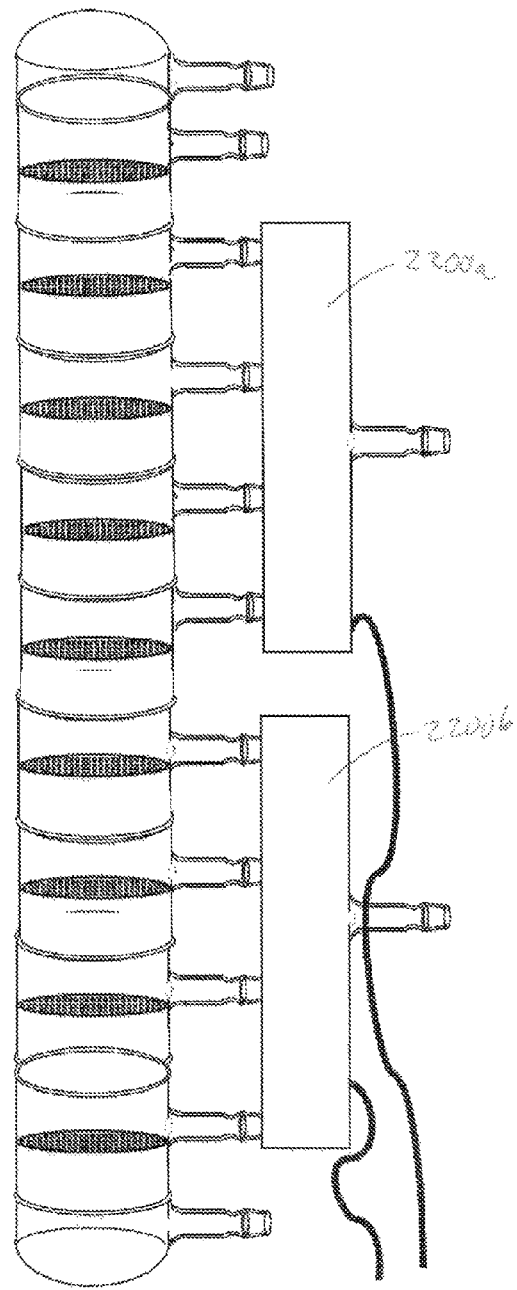
FIG. 22b shows the apparatus depicted in FIG. 22a provided with two 4-port electrically-controlled valve complex modules.

FIG. 22b shows the apparatus depicted in FIG. 22a provided with two 4-port electrically-controlled valve complex modules 2200a-2200b. Here the valve complex is implemented in a module physically designed to match the spacing, diameters, and fittings of the side ports for consecutively-coupled modular stages. In another implementation the ports can be connected to a valve complex via flexible tubing. In another embodiment the valve complex can comprise a larger or smaller number of ports. In an embodiment, the valve complexes depicted in FIG. 22b can itself be of modular design, permitting the ganging of an arbitrary number (between a maximum and minimum) of ports by fitting together a plurality of subunits.

It is noted that the same arrangements described above used to provide controllable variable feed structures can also be used to implement controllable variable take-off structures.

External Controllable Systems

As described earlier in conjunction with FIG. 8a, an assembly of modular stages can be additionally supported by one or more external controllable equipment systems such as heaters, heat-exchangers, pumps, photochemical light sources (as can be used for photochemical reactive distillation), and other items of AC-line powered equipment that typically do not provide any means for computer control. The invention provides for these to be controlled by a computer system via relay switching that is controlled by either a direct connection a computer system (for example via USB) or indirectly through a local communications network such as $I^2C$, 1-Wire®, etc.

Figure 23:
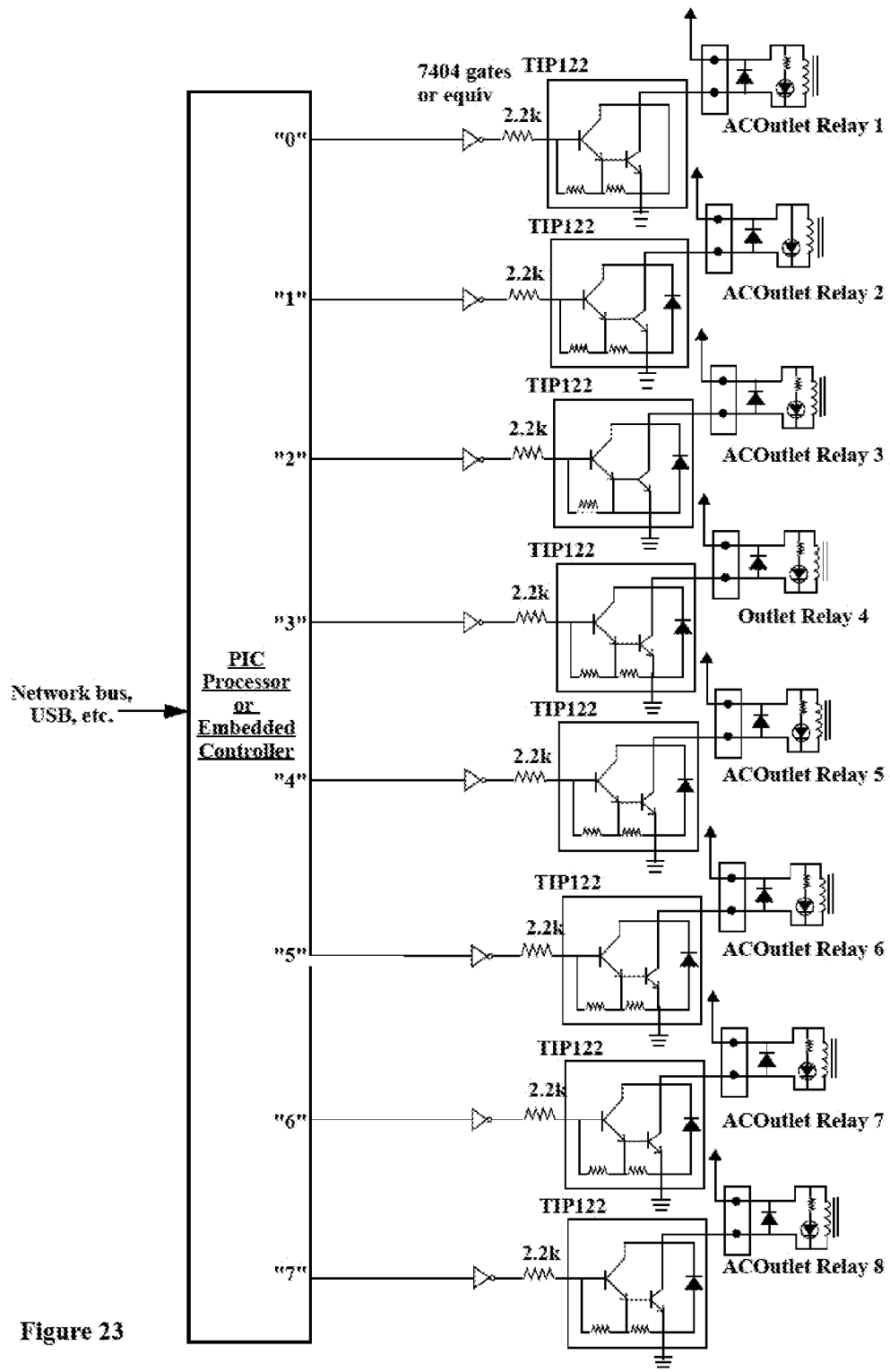
FIG. 23 shows an example electronic circuit for controlling a group of 8 AC outlet switching relays from either direct connection via USB or indirect connection through a local communications network such as I2C, 1-Wire®, etc.

In one approach an AC relay pack may be used, for example similar to the "SRP8 8-Channel Relay Pack" product sold by American DJ (Los Angeles, Calif.) for light control. FIG. 23 shows an example electronic circuit for controlling a group of 8 AC outlet switching relays from either direct connection via USB or indirect connection through a local communications network such as $I^2C$, 1-Wire®, etc.

Electronics, Computer Data Transfer Interfaces, Software Drivers

As described earlier in conjunction with FIGS. 8a-8e, the invention provides for electronics, computer data transfer interfaces, and software drivers for modular stage sensors. These can be used for gathering real-time sensor data from a plurality of sensors distributed within and around an assembly of modular stages. These can also be used to manipulate actuators and other moveable mechanical structures, as described above, under real-time software control. As described earlier, the invention provides for a data signal arrangement for via a simple electronic signal bus arrangement allowing a large column with a variety of sensor and/or controllable elements to be interfaced to a computer with a single small cable. Further, the invention provides for the electronic signal bus arrangement to be conveniently supported by the modular stages. In an embodiment, the modular stages can include internal conductors and connectors to implement portions of the electronic signal bus.

In an embodiment, the modular stages can include internal conductors and connectors to implement portions of an electrical power distribution bus.

Prototype Real-Time GUIs and Real-Time Data Capture Software

As described earlier in conjunction with FIGS. 8a-8e, the invention provides for real-time GUIs and real-time data capture software modules. The user interface can be used, for example, to display real-time sensor data from one or more of a plurality of sensors distributed within and around an assembly of modular stages. Similarly, the invention provides for manipulating actuators and other moveable mechanical structures under real-time software control as controlled by the real-time GUI.

Integration Framework for Real-Time GUI, Data Capture, Simulation

As described earlier in conjunction with FIG. 8e, the invention provides for integrating real-time GUIs and real-time data capture software modules with simulation software. Also as described earlier in conjunction with FIG. 8e, the invention comprises a framework for integrating at least a real-time GUI, data capture functions, and simulation functions.

Emulation and Integration of Real-Time Simulation and Monitoring

As described earlier in conjunction with FIGS. 8a-8e, the invention provides for integration of real-time simulation with real-time monitoring. The invention also provides for integrating real-time simulation and real-time process monitoring into the same computer system, as described in conjunction with the discussion of FIGS. 8a-8e. With this integration of real-time simulation and real-time process monitoring into the same computer system, the invention thus can provide for both real-time simulation and real-time process monitoring into the same computer system to be placed under the control of a common user interface. Additionally, the invention provides for additionally incorporating real-time sensor measurements from the laboratory-scale prototype to the integrated simulation model, for example using the simulation model to provide models of additional scale-up considerations. Accordingly, the simulation model can also be used to provide configuration control, reconfiguration control, and process control information to an operating assembly of modular stages and associated support equipment

Implementation and Study of New RD System Architectures Made Possible by the Invention As described throughout the earlier material, the invention provides vast support for exploring, prototyping, testing, studying, developing, and designing new types of RD system architectures.

As an example, the flexible modular elements permit construction of a wide range of flexible and arbitrarily feature-rich assemblies that can interface with configuration control software, process operation software, closed-loop control system software, design software, emulation software, and simulation software.

As another example, the earlier discussion in conjunction with FIG. 22b provides an environment for implementing controllable variable feed structures and controllable variable take-off structures.

As another example, the earlier discussion relating to controllable tray elements not only allows for comparative studies of one type of tray or tray parameter settings against another, but more profoundly to provide new features of tray-based reconfigurability, tray-based control, and tray modulation.

Similarly, the earlier discussion relating to controllable packing elements not only allows for comparative studies of one type of packing or packing parameter settings against another, but more profoundly to provide new features of packing-based reconfigurability, packing-property control, and packing-property modulation.

As another example, controllable light sources can be used for incorporating photochemical reactions into distillation, i.e., photochemical reactive distillation, as described above. The support for computer control of external equipment allows for additional external light-source arrangements that may be useful in photochemical reactive distillation.

Further, the modular stages can be used not only to assemble RD distillation columns but, as mentioned earlier, side reactors. The arrangements can also be interconnected with valves, valve complexes, and other equipment as described earlier. Accordingly, the invention supports linking an RD column to a cyclic separation reactor [6] which can, for example, be used to implement temperature swing and/or pressure swing processes (for example in the handling of azeotropic mixtures). In similar fashion, the invention supports linking an RD column to other types of separation elements [6,7] including those implementing one or more of chromatographic separation, membrane separation, reactive crystallization, reactive absorption, reactive adsorption, reactive extraction, reactive stripping, etc.

Also in a similar fashion, the invention provides for integrating cyclic separation reactor formalisms [6] directly into the RD process.

Mathematical and Computer Modeling of Reactive Distillation Processes

As discussed earlier in conjunction with the discussion of FIGS. 8b-8f, the invention includes explicit provisions for the availability, interfacing, coordinated use, and integration of computer-based numerical mathematical modeling of RD processes. These models can be used for design, analysis, simulation, emulation, and process control for RD processes associated with an assembly of modular stages and associated equipment.

In more detail, the invention provides for the model provisions, interfaces, and application to include modeling of various fluid and vapor configurations. As an example FIG. 24 depicts definitions of "control surfaces" that can be used in the invention in the modeling pressure drop between trays in the presence of liquid on a tray. FIG. 25 shows additional detail definitions that can be used in modeling drowned liquid entry at a tray. Within this context, FIGS. 26a-26d depict various conditions and definitions that can be supported by the arrangements of FIGS. 24 and 25. For example, FIGS. 26a and 26b depict respectively "subcritical" drowned entry and "subcritical" non-drowned entry conditions, while FIGS. 26c and 26d depict respectively "supercritical" drowned entry and "supercritical" hydraulic jump entry conditions, These can be utilized in fluid and mixed-phase models which in turn can be incorporated into larger-scale models of an RD column and yet larger models of an RD process. These models can be used for design, analysis, simulation, emulation, and process control. These models and simulations using them can also be used to produce presented or interactive visualizations resembling in the graphics used to depict FIGS. 24, 25, and 26a-26d.

Figure 27C:
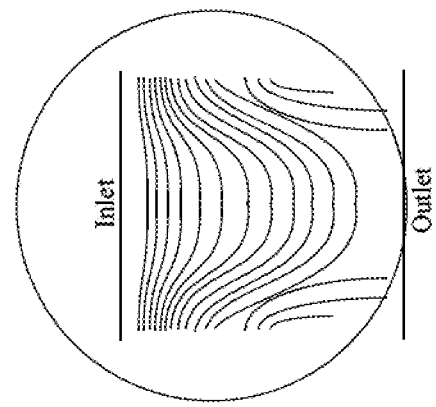
FIG. 27c depicts experimentally measured concentration profiles.
Figure 27B:
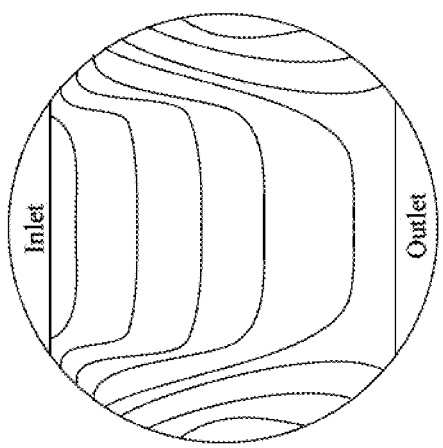
FIG. 27b depicts model-predicted concentration profiles from the stagnant regions.
Figure 27A:
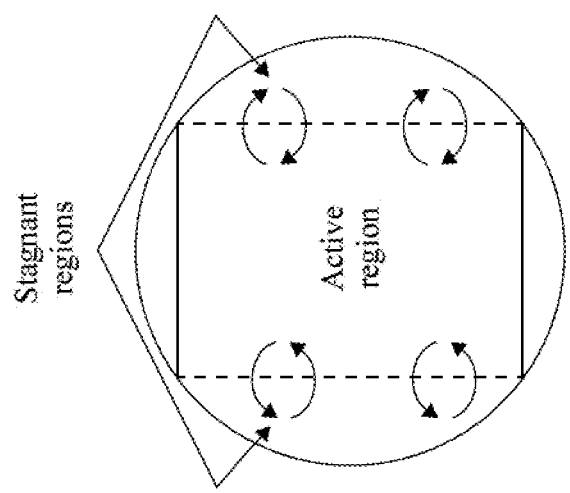
FIG. 27a depicts stagnant flow and active regions on a tray region of a distillation column that can be used for such modeling. Within this context.

The invention additionally provides for the modeling of flow concentration and mixing situations within the column. For example FIG. 27a depicts stagnant flow and active regions on a tray region of a distillation column that can be used for such modeling. Within this context, FIG. 27b depicts model-predicted concentration profiles from the stagnant regions. Contemporary models of this type, which are provided for by the invention, show good agreement with experimentally measures concentration profiles such as the one depicted in FIG. 27c. These models can be used for design, analysis, simulation, emulation, and process control. These models and simulations using them can also be used to produce presented or interactive visualizations resembling in the graphics used to depict FIGS. 27a-27c.

Figures 28, 29:
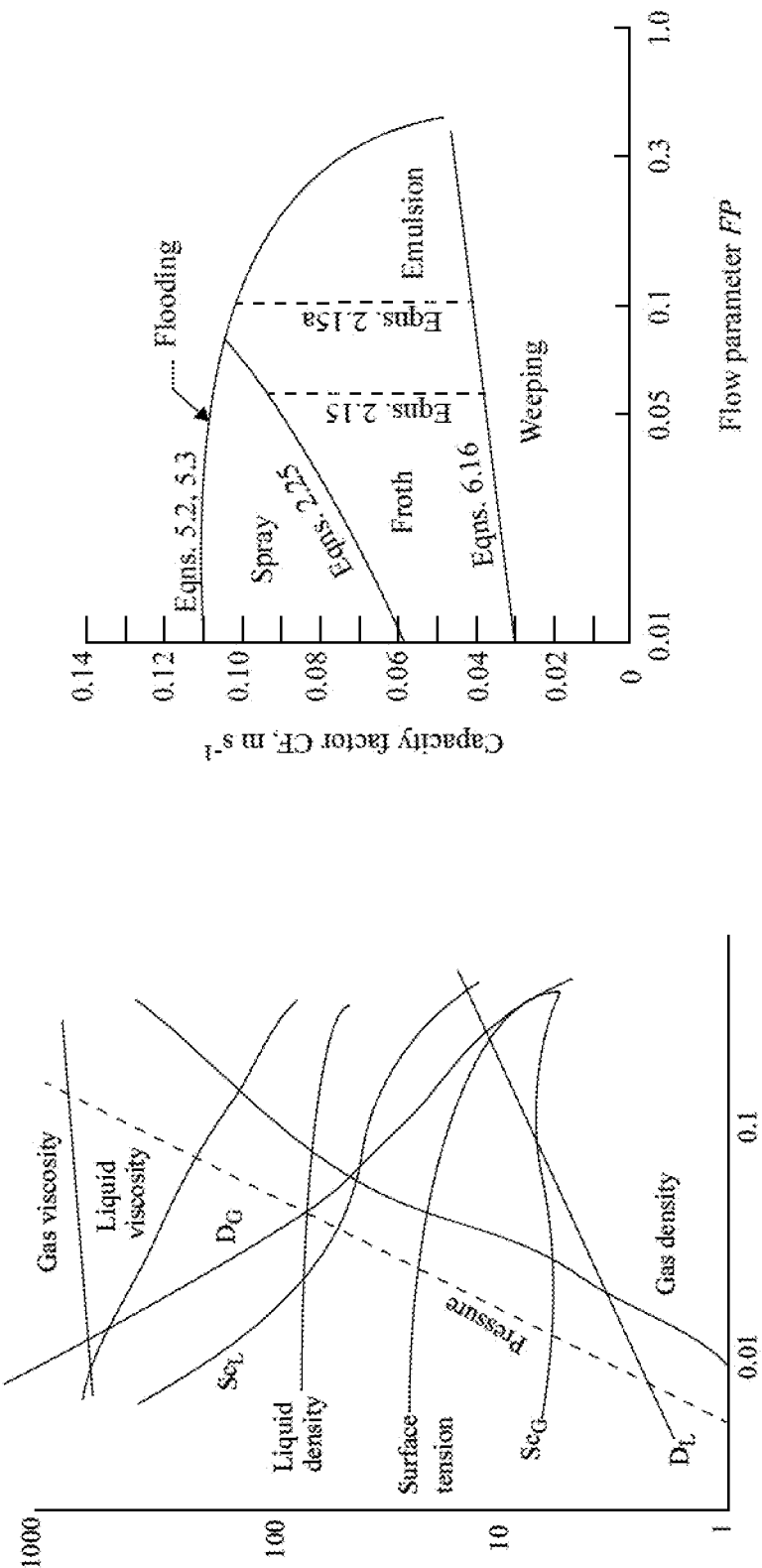
FIG. 28 depicts a classical view of various flow parameters useful in distillation involving gas density and viscosity, liquid density and viscosity, and surface tension.
FIG. 29 depicts a plot of capacity as a function of flow parameters for various flow regimes as can be used in modeling.
Figure 30:
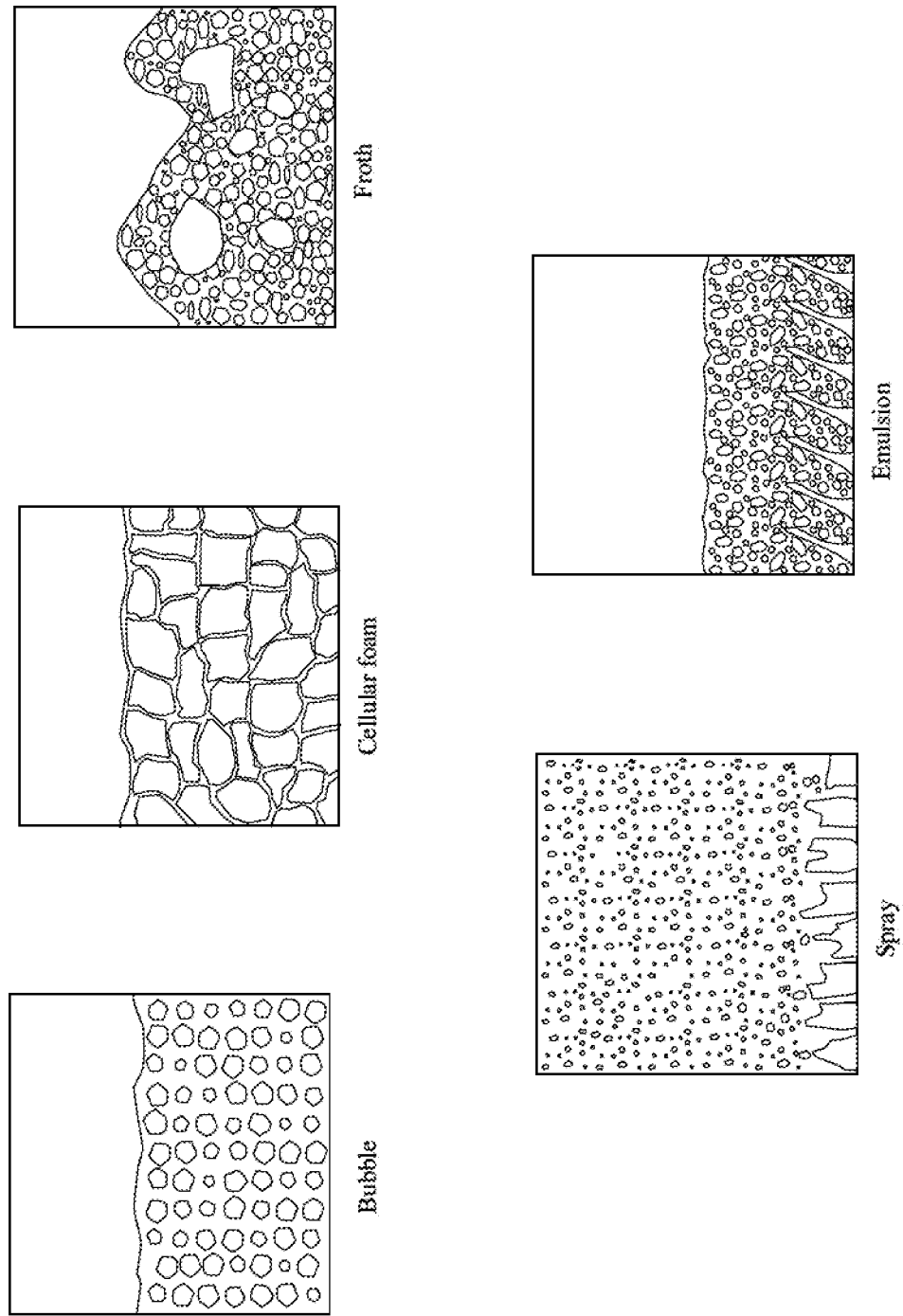
FIG. 30 depicts a number of example flow regimes that can be accommodated and integrated into models.

The invention additionally provides for model use and modeling of flow parameters. For example, FIG. 28 depicts a classical view of various flow parameters useful in distillation involving gas density and viscosity, liquid density and viscosity, and surface tension. These models can be used for design, analysis, simulation, emulation, and process control. The invention further provides for flow parameters to be used in modeling capacity factors for various flow regimes, for example as suggesting in the plot depicted in FIG. 29. FIG. 30 depicts a number of example flow regimes that can be accommodated and integrated into such models. Such models can be used for design, analysis, simulation, emulation, and process control.

Figure 31:
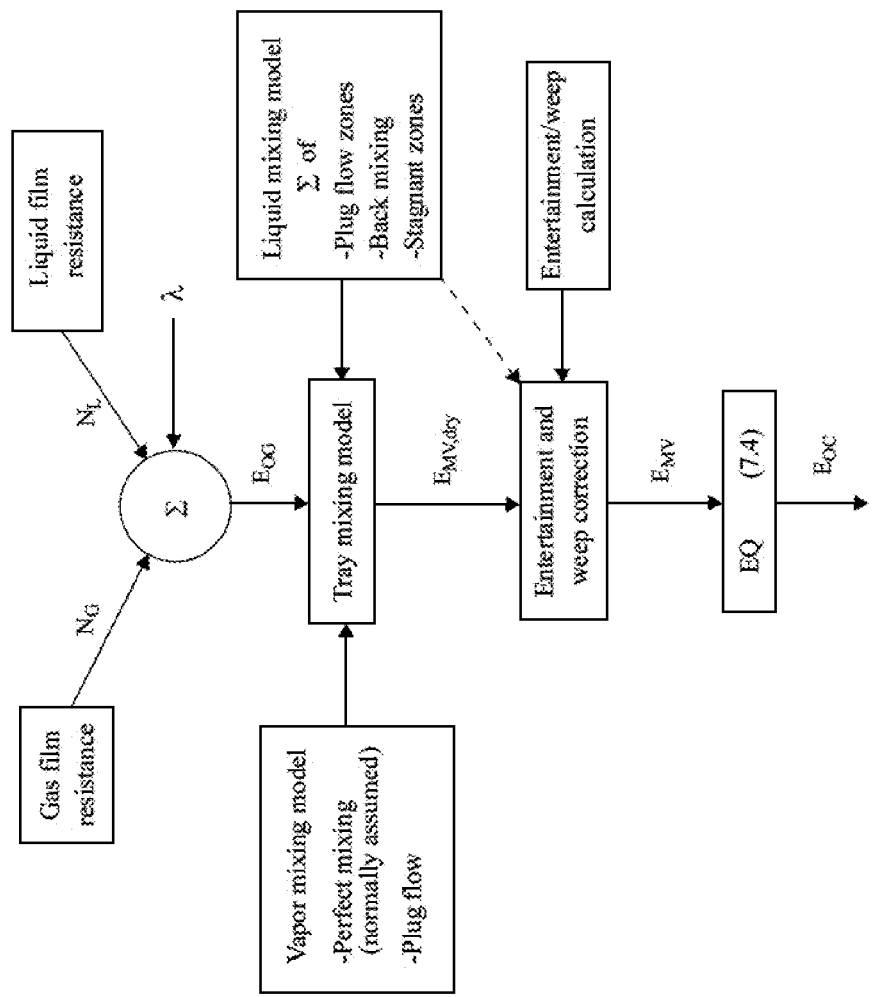
FIG. 31 depicts the sequential steps and dataflow in an exemplary stage equilibrium model as can be used by the invention for the modeling of a distillation column.

The invention provides for both dynamic models, as would be used in simulations and in process control, and well as equilibrium models. FIG. 31 depicts the sequential steps and dataflow in an exemplary stage equilibrium model as can be used by the invention for the modeling of a distillation column. Such models can be used for design, analysis, simulation, emulation, and process control.

Figure 32:
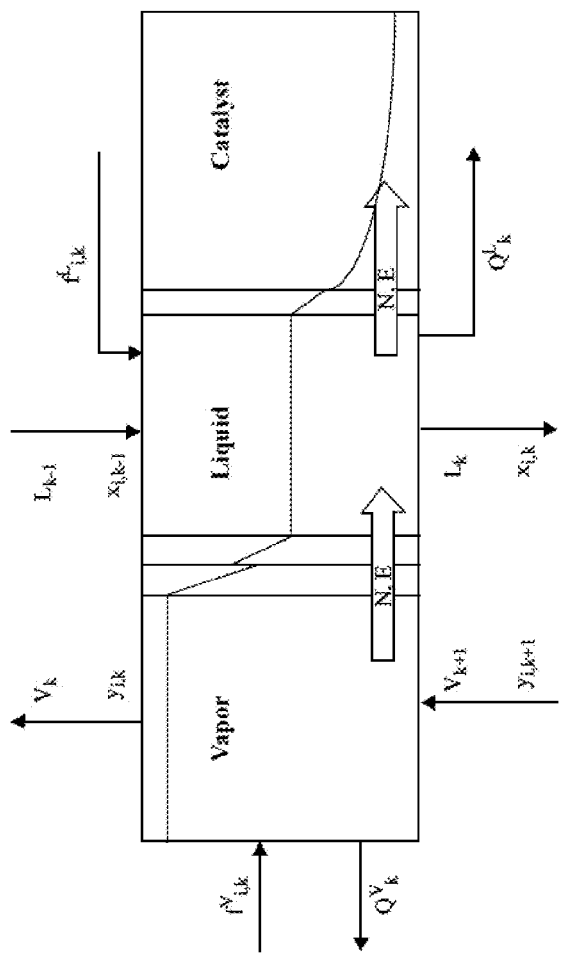
FIG. 32 depicts an example multiphase reaction rate and mass transfer model as can be used in modeling a distillation column involving catalysis.

The invention provides for multiphase reaction rate and mass transfer models. The invention also provides for such multiphase reaction rate and mass transfer models to include catalysis. FIG. 32 depicts an example multiphase reaction rate and mass transfer model as can be used in modeling a distillation column involving catalysis. Such models can be used for design, analysis, simulation, emulation, and process control. These models and simulations using them can also be used to produce presented or interactive visualizations resembling in the graphics used to depict FIG. 32.

Figure 33A:
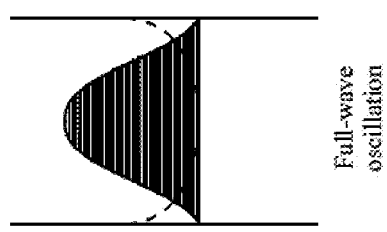
FIGS. 33a and 33b depict two example slosh oscillation patterns that can occur in a distillation column and which can be used for modeling.
Figure 33B:
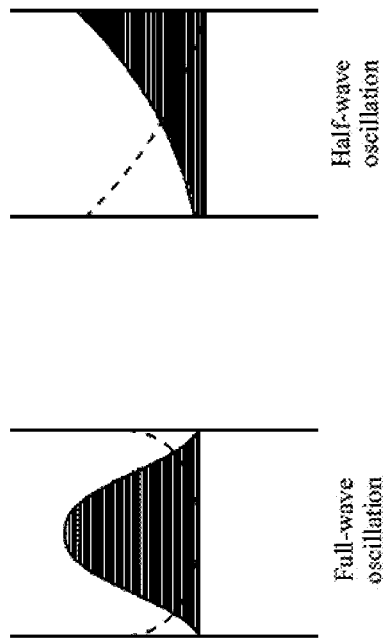

In the dynamic modeling of fluid processes and interaction with catalysis, the invention provides for the modeling of the processes and effects of slosh oscillation in tray regions. FIGS. 33a and 33b depict two example slosh oscillation patterns that can occur in a distillation column and which can be used for modeling. Such models can be used for design, analysis, simulation, emulation, and process control.

Spatiotemporal Dynamics and Possible Exploitation in Process Design

The invention provides for the measurement of spatiotemporal dynamics including self-organization and chaotic hierarchies. For example, the sensor arrays and lattices for use within modular stages as described earlier can be used to measure tray-region spatiotemporal dynamics in quantities such as temperature, ion concentration, pH, etc. Sensors distributed over several modular stages can also be used to measure larger-scale spatiotemporal dynamics in quantities such as pressure, temperature, ion concentration, pH, etc.

The invention provides for the modeling of spatiotemporal dynamics including self-organization and chaotic hierarchies. Such models can be used for design, analysis, simulation, emulation, and process control.

The invention further provides for a control system infrastructure for study of spatiotemporal dynamics. For example, changes in the parameters of trays, valve settings, feedstock inflow locations, etc. can be used to vary conditions.

The invention further provides measurement and closed-loop control system infrastructure for compensating for spatiotemporal dynamics in process control. For example, tray-parameter modulation or packing-parameter modulation may be used in closed loop control to quelch, stabilize, or induce a spatiotemporal behavior. Additionally, the invention provides a measurement and control system infrastructure for utilizing spatiotemporal dynamics in process control.

New Control System Approaches

As described throughout, the invention provides for new types of control system approaches and prototyping of their algorithmic implementations. Examples provided thus far in the previous discussion include tray-parameter modulation, packing-parameter modulation, variable feed location, variable outtake location, use of sensors and sensor arrays on trays, in regions between trays, and within packing, and control employing measurement and control of spatiotemporal dynamics. The invention additionally provides for use of bilinear system models such as those described in the section to follow.

Use of Numerical Computer-Executed Bilinear Differential Equation Models

The invention provides for the incorporation and use of numerical computer-executed bilinear differential equation (also known as "Bilinear System") models. FIG. 34 depicts a contro theory representation of a bilinear system.

There are at least two contexts where bilinear system models are especially relevant:
  Many types of chemical reaction processes, particularly those involving catalysis and chain reactions, naturally have bilinear system dynamics;
  Various controllable structures introduced by the invention, such as variable configuration trays, variable configuration packing, and (at least in principle) variable position feeds and outtakes. Bilinear systems are well-suited for modeling of variable-structure and reconfigurable dynamical systems, particularly those that involve changes in the complexity of the internal dynamics.

Figure 36:
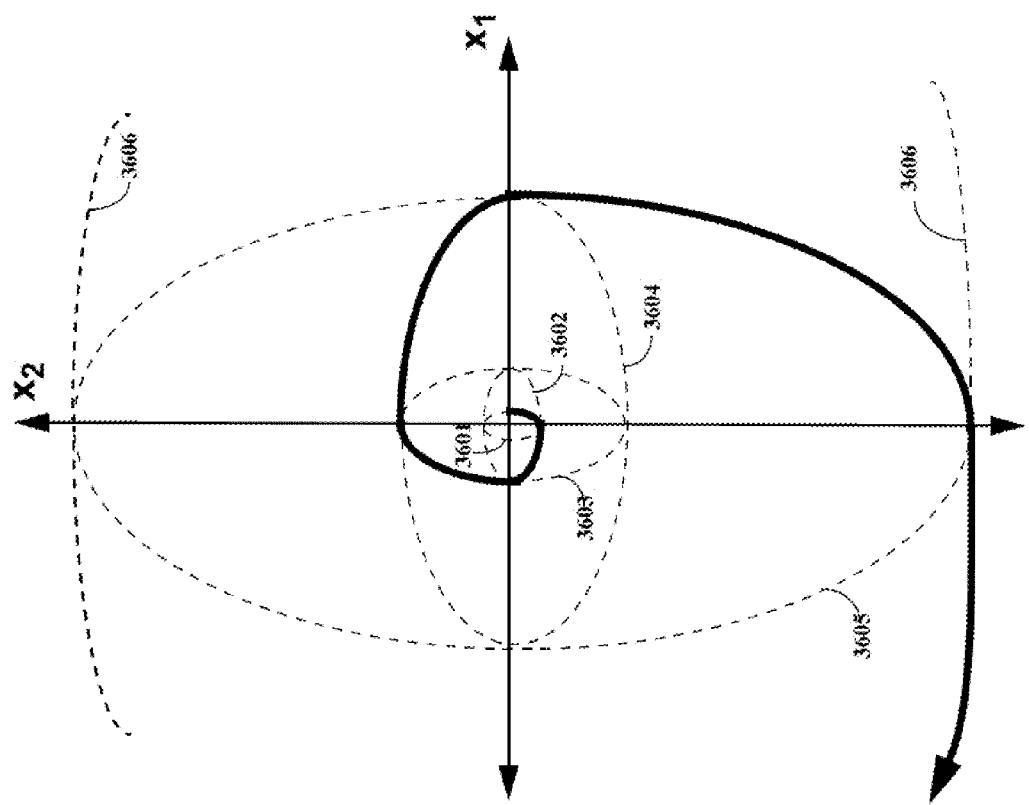
FIG. 36 depicts a parameterized stable elliptical trajectory with axis of eccentricity rotated by a small bounded periodic control variation may be "pumped" into unbounded instability.

An important point relevant to the invention is that linear and linearized models often cannot provide even a moderately accurate phenomenological model of an inherently bilinear system process. As an example, FIGS. 35a-35b depict an example of a reachable set of points within the reach of the system dynamics of a simple bilinear system that begins with a convex connected region (FIG. 35a) but evolves to include a hole, thus defining forbidden states (FIG. 35b). There is nothing like this in the theory and behavior of linear systems. As another example, FIG. 36 depicts a simple bilinear system parameterized stable elliptical trajectories with axis of eccentricity rotated between two angular positions 3605, 3604 and 3603, 3606 responsive to control input. A small bounded periodic control variation can be "pumped" into unbounded instability as shown by the bold-line trajectory path. Here, too, there is nothing like this in the theory and behavior of linear systems In more detail, the invention provides for the use of state variable bilinear differential equation models, i.e., of the type represented by FIG. 34. Additionally, the invention provides for the use of state variable bilinear differential equation models with state variable feedback. The invention further provides for the incorporation of bilinear differential equation state variable feedback stability models.

Additionally, bilieanr systems are also very useful in approximate modeling of a wide range of other types of nonlinear systems. The mathematician H. Sussman proved, for example, that the set of bilinear differential equations can be shown to be dense in the set of nonlinear systems. Thus the invention provides for use of its bilinear system modeling infrastructure to approximate other types of nonlinear models involved in RD physics, physical chemistry, and reaction dynamics. For example, the invention provides for the use of state variable bilinear differential equation models with state-variable feedback to render cross-product terms in a mathematical RD process model. Additionally, the invention provides for the use of state variable bilinear differential equation models in the identification, prediction, or study of a nonlinear instability. Further, the invention provides for the use of state variable bilinear differential equation models to be used in conjunction with a lab-scale system demonstrating an instability (for example, minor oscillations in operation).

Emulation of Scale-Up Process-Divergence and Associated Compensation

As described earlier, the invention provides an environment for exploring the emulation of scale-up process-divergence. For example, the invention as described clearly provides a meeting place between operation and modeling that can be used for identifying divergence processes that can be accurately modeled. This can be supplemented with additional models built on scale-up heuristics. The invention thus can also provide an environment for devising scale-up model compensation and applying it where appropriate (for example in a physical emulation context, numerical simulation context, etc.). Similarly, the invention thus can also provide an environment for devising scale-up measurement compensation and applying it where appropriate (for example in a physical emulation context, numerical simulation context, etc.).

While the invention has been described in detail with reference to disclosed embodiments, various modifications within the scope of the invention will be apparent to those of ordinary skill in this technological field. It is to be appreciated that features described with respect to one embodiment typically can be applied to other embodiments.

The invention can be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. Therefore, the invention properly is to be construed with reference to the claims.

REFERENCES

[1] Sundmacher, K.; Kienle, A., *Reactive Distillation-Status and Future Directions*, 2003, Wiley-VCH, ISBN 3-527-30579-3.
[2] Luyben, W.; Yu, C., *Reactive Distillation Design and Control*, 2008, John Wiley & Sons, ISBN 978-0-470-22612-4.
[3] Lockett, M., *Distillation Tray Fundamentals*, 1986, Cambridge University Press, ISBN 0-521-32106-9.
[4] Kister, H., *Distillation Design*, 1992, McGraw-Hill, ISBN 0-07-034909-6.
[5] Doherty, M.; Malone, M., *Conceptual Deign of Distillation Systems*, 2001, McGraw-Hill, ISBN 0-07-017423-7.
[6] Aida, T.; Silveston, P., *Cyclic Separating Reactors*, 2005, Blackwell Publishing, ISBN 1-4051-3156-X.
[7] Kulprathipanja, S., *Reactive Separation Processes*, 2002, Taylor & Francis, ISBN 1-56032-825-8.
[8] Luyben, W., *Distillation Design and Control and Using Aspen™ Simulation*, 2006, John Wiley & Sons, ISBN 0-471-77888-5.
[9] Reid, R.; Prausnitz, J.; Shrewood, T., *The Properties of Gases and Liquids*, 1977, McGraw-Hill, ISBN 0-07-051790-8.
[10] Pilling, Mark, "Column Efficiency—What to Expect and Why," 4*th Topical Conference on Separations Science and Technology*, November 1999 available at http://kolmetz.com/pdf/Column-efficiency.PDF (visited Sep. 12, 2010)
[11] Koshy, T. D.; Rukovena, F., "Distillation Pilot Plant Design, Operating Parameters and Scale-up Considerations," *Chemical Engineers' Resource Page*, available at http://www.cheresources.com/distillationmodel.pdf (visited Sep. 12, 2010).
[12] (American Institute of Chemical Engineers) Distillation Subcommittee of the Research Committee, *Bubble-tray Design Manual—Prediction of fractionation efficiency*, published by American Institute of Chemical Engineers, 1958, ISBN 6000150261.
[13] Ramachandran, P.; Dudukovic, M, "Experimental and Modeling Studies of Reactive Distillation," *AIChE 2006 Annual Meeting*, San Francisco, 2006, Abstract available at http://aiche.confex.com/aiche/2006/preliminaryprogram/abstract_76617.htm (visited Sep. 14, 2010).

I claim:

1. A method for creating laboratory-scale reactive distillation apparatus for use in research and emulation from modular components, the method comprising:
   providing a first type of reactive distillation modular stage comprising two physical interfaces for coupling the first type of reactive distillation modular stage to two other reactive distillation modular stages;
   providing a second type of reactive distillation modular stage comprising one physical interface for coupling the second type of reactive distillation modular stage to a single other reactive distillation modular stage;
   providing a tray element for insertion into the first type of reactive distillation modular stage;
   using a clamping arrangement for joining together at least three reactive distillation modular stages at their respective physical interfaces, wherein the at least three reactive distillation modular stages comprise the first type of reactive distillation modular stage and the second type of reactive distillation modular stage, and
   reconfiguring the at least three reactive distillation modular stages based on a target operation, wherein at least one of the reactive distillation modular stages includes at least one of an attachable sensor, a built-in sensor, a controllable actuator, a computer interface, and adjustable internal structures.

2. The method of claim 1, the method further comprising providing at least one sensor for insertion into the first type of reactive distillation modular stage.

3. The method of claim 2 wherein the at least one sensor is a temperature sensor.

4. The method of claim 2 wherein the at least one sensor is a pressure sensor.

5. The method of claim 2 wherein the at least one sensor comprises a pH sensor.

6. The method of claim 2 wherein the at least one sensor comprises an ion sensor.

7. The method of claim 2 wherein the at least one sensor comprises a spectroscopy sensor.

8. The method of claim 2 wherein the at least one sensor comprises a linear array of a plurality of individual sensors.

9. The method of claim 2 wherein the at least one sensor comprises a two-dimensional lattice array of a plurality of individual sensors.

10. The method of claim 2 wherein the at least one sensor produces measurement data that is transmitted on a network bus.

11. The method of claim 2 wherein the at least one sensor produces measurement data that is transmitted to a computer.

12. The method of claim 1 wherein the first type of reactive distillation modular stage comprises a port providing flow connectivity with the interior of the first type of reactive distillation modular stage.

13. The method of claim 1 wherein the second type of reactive distillation modular stage comprises a port providing flow connectivity with the interior of the second type of reactive distillation modular stage.

14. The method of claim 1, the method further comprising providing at least one light source for insertion into the first type of reactive distillation modular stage.

15. The method of claim 14 wherein the light source is used as part of a spectroscopy sensor arrangement within the respective reactive distillation modular stage.

16. The method of claim 14 wherein the light source is used to induce photochemical reactions within the respective reactive distillation modular stage.

17. The method of claim 1 wherein the tray comprises at least one mechanically movable component that can be physically manipulated by a magnetic field.

18. The method of claim 17 wherein the magnetic field is produced by an electromagnetic coil.

19. The method of claim 18 wherein the electromagnetic coil is controlled by signals received from a network bus.

20. The method of claim 18 wherein the electromagnetic coil is controlled by signals received from a computer.

* * * * *